(12) United States Patent
Shimojo et al.

(10) Patent No.: US 7,520,255 B2
(45) Date of Patent: Apr. 21, 2009

(54) CONTROL FOR AN ENGINE HAVING A VARIABLE VALVE-DRIVING UNIT

(75) Inventors: Kanako Shimojo, Saitama (JP); Yuji Yasui, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 311 days.

(21) Appl. No.: 11/150,486

(22) Filed: Jun. 13, 2005

(65) Prior Publication Data

US 2006/0027196 A1  Feb. 9, 2006

(30) Foreign Application Priority Data

Jul. 14, 2004  (JP) .............................. 2004-207130

(51) Int. Cl.
*F01L 1/34* (2006.01)
(52) U.S. Cl. ................ 123/90.17; 123/90.15; 123/90.31
(58) Field of Classification Search .............. 123/90.15, 123/90.16, 90.17, 90.31
See application file for complete search history.

(56) References Cited

U.S. PATENT DOCUMENTS

2002/0139329 A1* 10/2002 Machida ................... 123/90.16

FOREIGN PATENT DOCUMENTS

| EP | 1 223 319 A1 | 7/2002 |
|---|---|---|
| EP | 1 318 286 A2 | 6/2003 |
| JP | 2001-263099 A | 9/2001 |
| JP | 2002-266611 A | 9/2002 |
| JP | 2002-309994 A | 10/2002 |
| JP | 2002-332876 A | 11/2002 |

\* cited by examiner

*Primary Examiner*—Zelalem Eshete
(74) *Attorney, Agent, or Firm*—Arent Fox LLP

(57) ABSTRACT

A control for avoiding interference between a valve and a piston of an engine is provided. The engine has a variable lift mechanism that is capable of changing a lift amount of the valve and a variable phase mechanism that is capable of changing a phase of the valve. A predicted value of the phase is calculated. A first determination of whether or not the predicted value has exceeded a first predetermined value is made. If it is determined that the predicted value has exceeded the first predetermined value, at least one of the lift amount and the phase is changed to avoid the interference between the valve and the piston. By using the predicted value, the interference can be avoided without delay.

22 Claims, 16 Drawing Sheets

(a)

(b)

(a)

(b)

(a)

(b)

CONTROL FOR AN ENGINE HAVING A VARIABLE VALVE-DRIVING UNIT

BACKGROUND OF THE INVENTION

The present invention relates to a control for avoiding interference between a piston and a valve in an internal-combustion engine having a variable lift mechanism that is capable of changing a lift amount of the valve of the engine and a variable phase mechanism that is capable of changing a phase of the valve.

Some variable valve-driving units for an engine comprise a mechanism that is capable of variably controlling a lift amount of an intake/exhaust valve (hereinafter referred to as a "valve") of the engine and a mechanism that is capable of variably controlling a phase of the valve. By controlling the lift amount and the phase, an air amount introduced into the engine can be controlled, and hence a desired engine output can be achieved.

When the lift amount and/or the phase are changed, interference (collision) may occur between the valve and a piston of the engine. Several techniques for avoiding such interference have been proposed.

According to one example, a recess is formed at the upper portion of the piston so that the recess can accommodate a head of the valve. According to another example, a range within which the lift amount and the phase can be changed is limited so as to prevent interference between the valve and the piston.

According to a technique disclosed in the Japanese Patent Application Publication No. 2002-332876, it is determined whether or not a difference between an actually measured value and a desired value of the lift amount of the valve is greater than a predetermined value. If it is determined that the difference is greater than the predetermined value, the phase of the valve is retarded by a predetermined amount because there is a possibility that an interference warning line may be exceeded (that is, overshooting may occur).

In the case of providing the recess at the upper portion of the piston, the emission may deteriorate because noncombustible gas is easy to remain in the recess. Such noncombustible gas may increase the combustion time, which may reduce the efficiency of the combustion.

According to the technique of limiting the range for changing the lift amount and the phase, optimizing the overlap between the intake valve and the exhaust valve may be difficult. If such optimization of the overlap is not achieved, residual gas (internal EGR) may increase, which may inhibits the improvement of the fuel efficiency.

Since a desired engine output can be achieved by controlling the lift amount and the phase, a throttle valve can be removed, thereby decreasing the pumping loss. However, if the range for changing the lift amount and the phase is limited, lift amount/phase control alone may not achieve a desired engine output.

The above-described problems may be partially resolved by the above technique disclosed in the Japanese Patent Application Publication No. 2002-332876. However, according to this technique, since a determination of whether the interference avoiding action is started is based on a difference between the actually measured value and a desired value of the lift amount, the avoidance may be delayed and hence the interference may occur between the valve and the piston when the lift amount or the phase sharply overshoots. In order to avoid such interference, it is required to make a range where interference needs to be warned wider. However, under such a wider interference warning range, the optimal lift amount and phase may not be used for operating the engine.

Therefore, there is a need for a control that is capable of avoiding interference between a valve and a piston without delay while operating an engine with an optimal lift amount and an optimal phase.

SUMMARY OF THE INVENTION

According to one aspect of the present invention, a control for avoiding interference between a valve and a piston of an engine is provided. The engine has a variable lift mechanism for changing a lift amount of the valve and a variable phase mechanism for changing a phase of the valve. A predicted value (Pre_$\theta$) of the phase is calculated. A first determination of whether or not the predicted value has exceeded a first predetermined value ($\theta$s1, $\theta$s2) is made. If it is determined that the predicted value has exceeded the first predetermined value, at least one of the lift amount and the phase is changed to avoid the interference between the valve and the piston.

The interference avoidance is performed by setting at least one of the lift amount and the phase in an interference avoidance value. The interference avoidance value (Lsf) for the lift amount indicates a lift amount with which the interference between the valve and the piston can be avoided at any phase. The interference avoidance value ($\theta$sf) for the phase indicates a phase with which the interference between the valve and the piston can be avoided at any lift amount.

The predicted value is calculated based on the amount of change in the actually measured phase. In one embodiment, timing at which the actually measured value of the phase is obtained changes depending on a rotational speed of the engine. In this case, the predicted value is preferably calculated taking into account the rotational speed of the engine.

In one embodiment, a limit value ($\theta$s1) of the phase at which no interference occurs between the valve and the piston is determined as the above first predetermined value. The limit value is determined based on an actually measured value of the lift amount. In another embodiment, a value ($\theta$s2) obtained by adding a predetermined margin value ($\theta$a1) to limit value is determined as the first predetermined value.

According to one embodiment of the present invention, a second determination of whether or not the actually measured value of the phase has exceeded a second predetermined value ($\theta$s1) is made. If it is determined by the first determination that the predicted value has exceeded the first predetermined value or if it is determined by the second determination that the actually measured value of the phase has exceeded the second predetermined value, at least one of the lift amount and the phase is changed to avoid the interference between the valve and the piston.

In one embodiment, a limit value ($\theta$s1) of the phase at which no interference occurs between the valve and the piston is determined as the second predetermined value. The limit value is determined based on the actually measured value of the lift amount.

According to one embodiment of the present invention, if the lift amount is changed by the action of the interference avoidance, the changed lift amount is kept at least until the variable lift mechanism is reset. If the phase is changed by the action of the interference avoidance, the changed phase is kept at least until the variable phase mechanism is reset.

According to another embodiment of the present invention, the second determination may be configured to determine whether or not the actually measured value of the lift amount has exceeded a second predetermined value. In this case, a limit value of the lift amount at which no interference occurs between the valve and the piston is determined as the second predetermined value. The limit value is determined based on the actually measured value of the phase.

According to another aspect of the present invention, a predicted value of the lift amount is calculated instead of the predicted value of the phase. If it is determined that the predicted value of the lift amount has exceeded a predetermined value, at least one of the lift amount and the phase is changed to avoid interference between a valve and a piston.

According to the present invention, a possible occurrence of the interference can be predicted because the predicted value of the phase is used. For example, even when the phase or the lift amount abruptly changes due to a failure in the variable phase mechanism and/or the cam-driving system of the engine, using such a predicted value allows the interference between the valve and the piston to be avoided.

DESCRIPTION OF THE PREFERRED EMBODIMENTS

Figure 1:
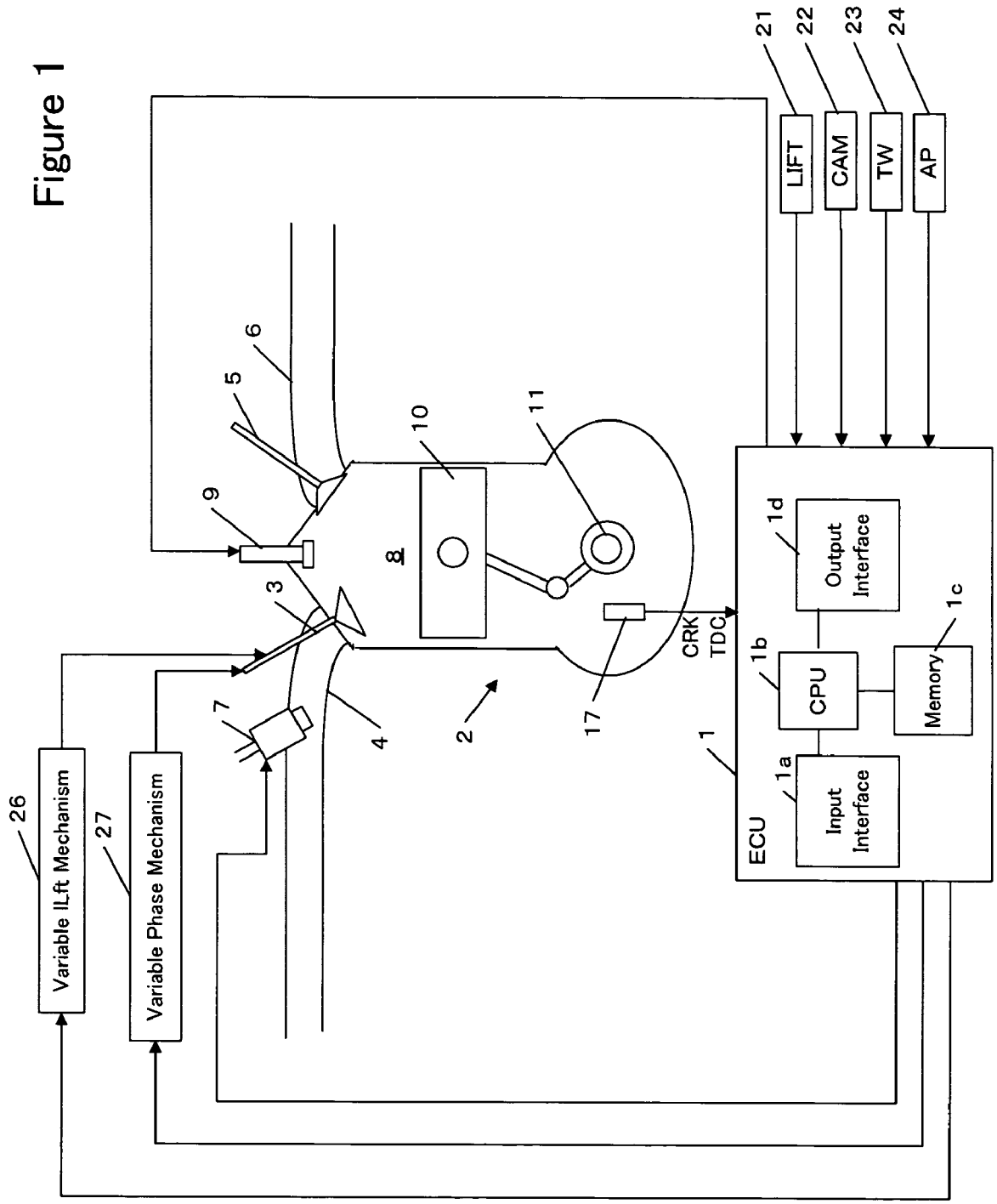
FIG. 1 is a block diagram showing an overall structure of an engine and its control unit in accordance with one embodiment of the present invention.

Referring to the drawings, specific embodiments of the invention will be described. FIG. 1 is a block diagram showing an internal combustion engine (hereinafter referred to as an engine) and a control unit for the engine in accordance with one embodiment of the invention.

An electronic control unit (hereinafter referred to as an ECU) 1 is essentially a computer and comprises an input interface 1a for receiving data sent from each part of the vehicle, a CPU 1b for carrying out operations for controlling each part of the vehicle, a memory 1c including a read only memory (ROM) and a random access memory (RAM), and an output interface 1d for sending a control signal to each part of the vehicle. Programs and various data for controlling each part of the vehicle are stored in the ROM. One or more programs and data for performing a control in accordance with the invention are also stored in the ROM. The ROM may be a rewritable ROM such as an EPROM. The RAM provides work areas for operations by the CPU 1b, in which data sent from each part of the vehicle as well as a control signal to be sent out to each part of the vehicle are temporarily stored.

An engine 2 is, for example, a 4-cylinder, 4-cycle engine. One of the cylinders is shown in the figure. The engine 2 is connected to an air intake manifold 4 through an air intake valve 3 and connected to an exhaust manifold 6 through an exhaust valve 5. A fuel injection valve 7 for injecting fuel in accordance with a control signal from the ECU 1 is disposed in the intake manifold 4. A spark plug 9 is provided in a combustion chamber 8 to ignite a spark in accordance with an ignition timing signal from the ECU 1.

The engine 2 takes air-fuel mixture from air taken from the intake manifold 4 and fuel injected by the fuel injection valve 7 into the combustion chamber 8. The air-fuel mixture is combusted by the spark ignited by the spark plug 9. The combustion increases the volume of the mixture, which pushes downward on the piston 10. The reciprocating motion of the piston 10 is converted into the rotation motion of the crankshaft 11. In the 4-cycle engine, there are intake, compression, combustion and exhaust strokes. The piston 10 travels up and down four times in one combustion cycle.

A crank angle sensor 17 is disposed in the engine 2. The crank angle sensor 17 outputs a CRK signal and a TDC signal to the ECU 1 in accordance with the rotation of the crankshaft 11.

The CRK signal is a pulse signal that is output at every predetermined crank angle. The ECU 1 calculates a rotational speed NE of the engine 2 in accordance with the CRK signal. The TDC signal is also a pulse signal that is output at a crank angle associated with a TDC (top dead center) position of a piston 10.

A lift amount sensor 21 is connected to the ECU 1. The lift amount sensor 21 detects a lift amount Lift of the intake vale 3 (and/or exhaust valve 5) and sends it to the ECU 1. In this example, the lift amount Lift is detected at a predetermined time interval (for example, 5 milliseconds).

A cam angle sensor 22 is connected to the ECU 1. The cam angle sensor 22 outputs a pulse signal CAM to the ECU 1 at every predetermined cam angle in accordance with the rotation of a camshaft (not shown) connected to the intake valve 3 through an intake cam.

In this example, the engine has four cylinders and a TDC signal is issued for each cylinder. Therefore, the TDC signal is detected each time the crank shaft 11 rotates 90 degrees. The CAM signal is detected each time the camshaft rotates 90 degrees. The ECU 1 calculates a phase difference of the CAM signal relative to the TDC signal, that is, calculates an actual phase Cain of the camshaft relative to the crankshaft.

An engine water temperature (TW) sensor 23 is attached to the cylinder peripheral wall, which is filled with cooling water, of the cylinder block of the engine 2. A temperature of the engine cooling water detected by the TW sensor 10 is sent to the ECU 1.

An accelerator pedal opening (AP) sensor 24 is connected to the ECU 1. The accelerator pedal opening sensor 24 detects the opening angle of the accelerator pedal and sends it to the ECU 1.

A variable lift mechanism 26 is a mechanism that is capable of changing the amount of lift of the intake valve 3 in accordance with a control signal from the ECU 1. The variable lift mechanism 26 can be implemented by any known technique. For example, a so-called VTEC mechanism includes multiple cams having different forms to switch the cams in accordance with the operating condition of the engine. The lift amount of the intake valve is different depending on the selected cam (refer to, for example, Japanese Patent Application Publication H07-197846). The variable lift mechanism 26 can be also configured to change the amount of lift of the exhaust valve 5. An example of the lift mechanism 26 used in the embodiment will be described later referring to FIG. 2.

A variable phase mechanism (which is called a VTC) 27 is a mechanism that is capable of changing an opening/closing timing of the intake valve 3 in accordance with a control signal from the ECU 1. The variable phase mechanism 27 can be implemented by any known technique. For example, a technique for electromagnetically controlling the phase of the intake valve to advance or retard (refer to, for example, Japanese Patent Application Publication No. 2000-227033) has been proposed. The variable phase mechanism 27 can be also configured to change the phase of the exhaust valve 5. An example of the phase mechanism 27 used in the embodiment will be described later referring to FIG. 3.

Alternatively, the variable lift mechanism and the variable phase mechanism may be integrated into a single system.

Signals sent to the ECU 1 are passed to the input interface 1a. The input interface 5a converts analog signal values into digital signal values. The CPU 1b processes the resulting digital signals, performs operations in accordance with one or more programs stored in the memory 1c, and creates control signals. The output interface 1d sends these control signals to actuators for the fuel injection valve 7, spark plug 9, and other mechanical components.

Figure 2:
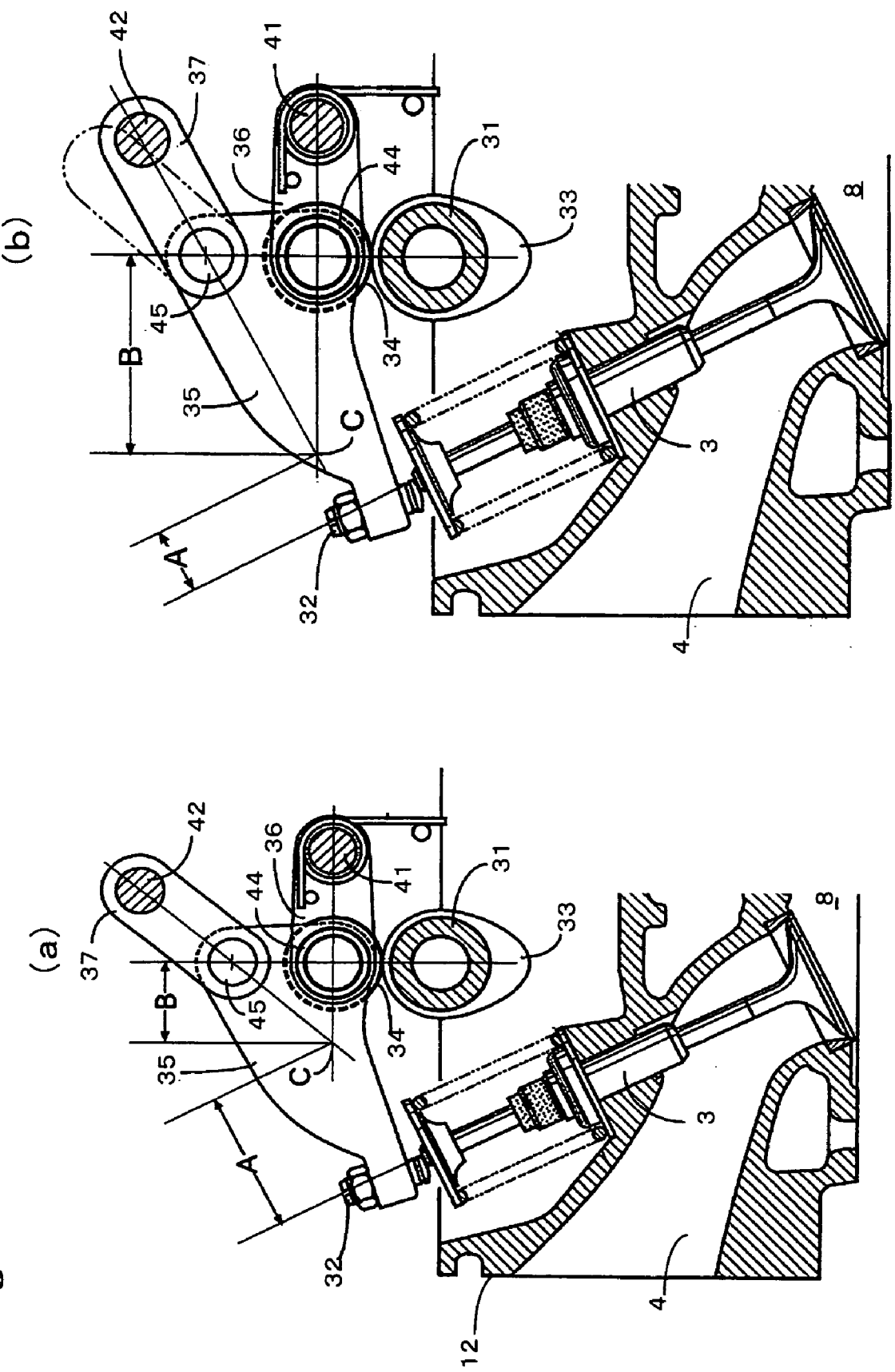
FIG. 2 schematically shows a variable lift mechanism in accordance with one embodiment of the present invention.

FIG. 2 shows the variable lift mechanism 26 in accordance with one embodiment of the present invention. The variable lift mechanism 26 includes a camshaft 31, a tappet screw 32 and a rocker arm 35. The tappet screw 32 is positioned at a top end of the intake valve 3 and connected to one end of the rocker arm 35. The rocker arm 35 has a roller 34 that rotatably contacts a cam 33 provided in the camshaft 31. The roller 34 is rotatably supported by a supporting cylinder 44 that has the axis line parallel to the camshaft 31. A first link arm 36 and a second link arm 37 are connected to the rocker arm 35.

A supporting shaft 41 provided at one end of the first link arm 36 is connected to a cylinder head 12 at a fixed position. A supporting shaft 42 provided at one end of the second link arm 37 can be steplessly driven by an actuator (not shown). When the lift amount of the intake valve 3 is maximized, the supporting shaft 42 of the second link arm 37 is disposed at a position shown in FIG. 2(a). When the lift amount is decreased from the maximum value, the supporting shaft 42 of the second ink arm 37 is moved downward by the actuator as shown in FIG. 2(b).

An instantaneous center C of the rocker arm 35 is a point of intersection of a straight line connecting the supporting shaft 41 with the supporting cylinder 44 and a straight line connecting the supporting shaft 42 with a connecting shaft 45. When the supporting shaft 42 is moved from the position shown in FIG. 2(a) to the position shown in FIG. 2(b) by the actuator, a lever ratio (=A/B) changes. The lever ratio represents a ratio of a distance (A) between a contact point at which the tappet screw 32 contacts the intake valve and the instantaneous center C to a distance (B) between a contact point at which the roller 34 contacts the cam 33 and the instantaneous center C. The lever ratio of FIG. 2(b) is smaller than that of FIG. 2(a).

Because of a change of the lever ratio, the lift amount becomes the maximum if the roller 34 is pushed up by the cam 33 when the supporting shaft 42 is located at the position shown in FIG. 2(a). The lift amount becomes, for example, about 20% of the maximum value if the roller 34 is pushed up by the cam 33 when the supporting shaft 42 is located at the position shown in FIG. 2(b).

Since the position of the supporting shaft 42 can be changed steplessly by the actuator, the lever ratio can be steplessly changed. As a result, the lift amount of the intake valve 3 can be steplessly changed, The actuator receives a desired lift amount from the ECU 1 and changes the position of the supporting shaft 42 so as to achieve the desired list amount.

Figure 3:
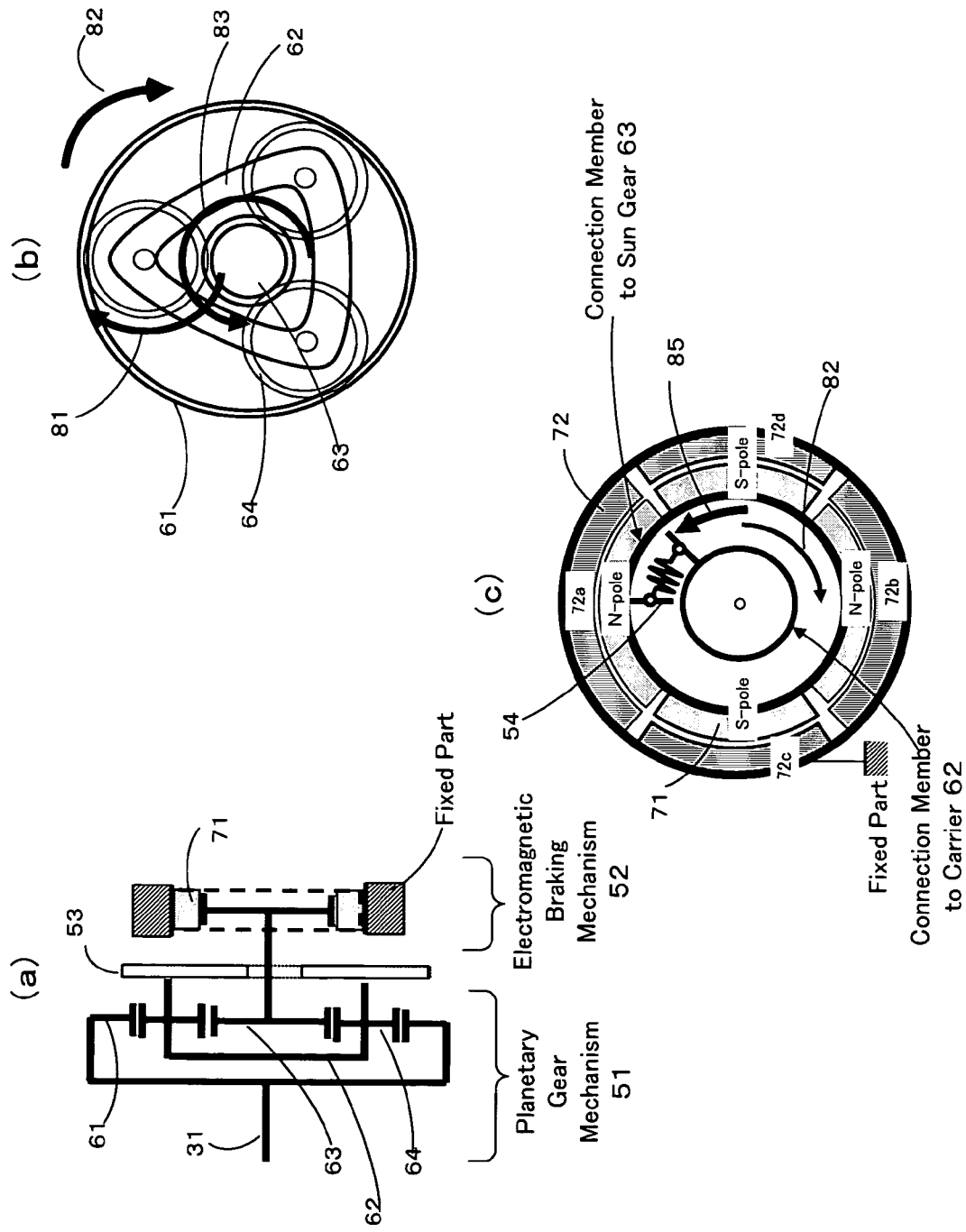
FIG. 3 schematically shows a variable phase mechanism in accordance with one embodiment of the present invention.

FIG. 3 shows the variable phase mechanism 27 in accordance with one embodiment of the present invention. FIG. 3(a) shows a side view of the variable phase mechanism 27. The variable phase mechanism 27 comprises a planetary gear mechanism 51 and an electromagnetic braking mechanism 52. FIG. 3(b) shows a front view of the planetary gear mechanism 51. FIG. 3(c) shows a front view of the electromagnetic braking mechanism 52.

The planetary gear mechanism 51 includes a ring gear 61 connected to the camshaft 31, a carrier 62 connected to a sprocket 53 (which is connected to the crankshaft 11 through a chain or the like so as to receive the rotation force from the crankshaft 11) and a sun gear 63 connected to the electromagnetic braking mechanism 52. A plurality of planetary gears 64 are rotatably supported by the carrier 62 and are engaged with the ring gear 61 and the sun gear 63.

The electromagnetic braking mechanism 52 has a permanent magnet 71, an electromagnet 72 and a return spring 54. In FIG. 3(c), the permanent magnet 71 is shown by dot-hatched area. N-poles and S-poles are alternately arranged. The permanent magnet 71 is connected to the sun gear 63 through a connection member. The electromagnet 72 is disposed outside of the permanent magnet 71 as shown by line-hatched area. The electromagnet 72 is connected to an actuator (not shown). A control of energization applied to the electromagnet 72 can switch the magnetic polarity of the electromagnet 72 between N and S. The return spring 54 is connected between the connection member to the sun gear 63 and the connection member to the carrier 62.

If the carrier rotates in the direction of arrow 81 in accordance with the rotation of the sprocket 53 when the electromagnet 72 is de-energized by the actuator, the ring gear 61 rotates in the direction of arrow 82 in accordance with the rotation of the carrier 62, which causes the camshaft 31 to rotate. The sun gear 63 freely rotates in the direction of arrow 83. In this situation, a phase of the cam is most retarded relative to the sprocket.

If the electromagnet 72 is energized by the actuator so that portions 72a and 72b of the electromagnet are N-pole and portions 72c and 72d are S-pole, N-pole and S-pole of the permanent magnet 71 are drawn to S-pole and N-pole of the electromagnet, respectively. As a result, a braking force 85 is applied to the connection member of the sun gear 63 against the biasing force of the return spring 54.

A rotational speed of the carrier 62 is limited by a rotational speed of the sprocket 53. A relative rotational speed of the sun gear 63 to the carrier 62 is increased by the braking force 85. By the principle of operation of the planetary gears, as the relative rotational speed of the sun gear to the carrier 62 increases, the relative rotational speed of the ring gear 61 to the carrier 62 increases. That is, a relative rotational speed of the camshaft 31 to the sprocket 53 increases. As a result, the rotation of the camshaft 31 is advanced relative to the sprocket 53.

Thus, the phase of the camshaft 31 can be controlled to a desired value by controlling the braking force 85 to the sun gear 63 through the energization of the electromagnet 72. The actuator receives a desired phase from the ECU 1 and controls the energization applied to the electromagnet so as to achieve the desired phase.

Figure 4:
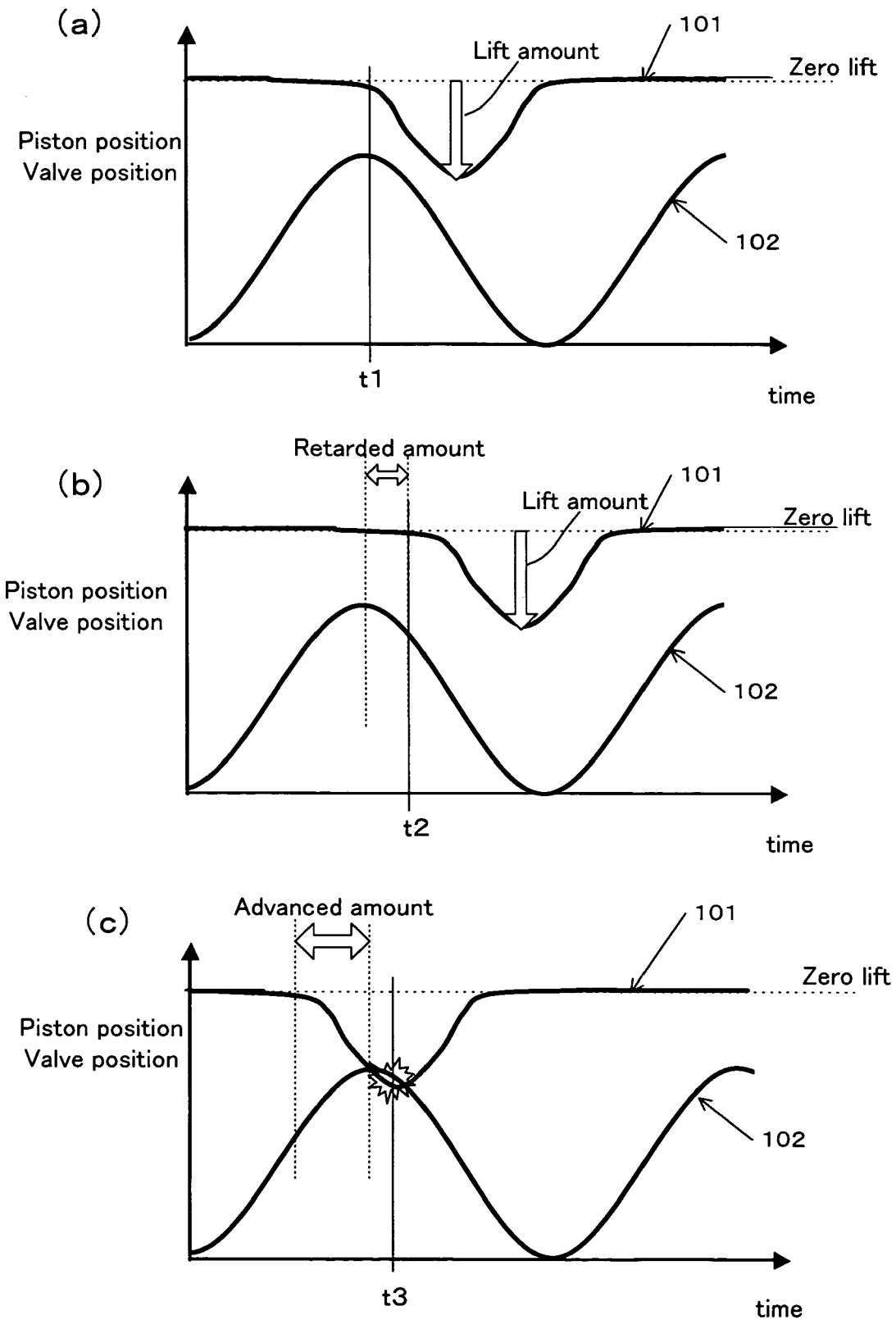
FIG. 4 graphically shows exemplary behaviors of a valve and a piston.

A principle of the present invention will be described referring to FIGS. 4 and 5. FIG. 4(a) shows exemplary behaviors of the valve and the piston. Reference numeral 101 indicates a lift amount of the valve and reference numeral 102 indicates a position of the piston. The valve starts to open immediately before the piston reaches a top dead center (time t1). In the case where the valve opens at such a normal phase, no interference (collision) occurs between the valve and the piston.

Referring to FIG. 4(b), because the phase of the valve is retarded, the valve starts to open after the piston has reached the top dead center (time t2). In this case, too, no interference occurs between the valve and the piston.

Referring to FIG. 4(c), because the phase of the valve is advanced, the valve starts to open before the piston reaches the top dead center. In this case, there is a possibility that interference occurs between the valve and the piston (time t3).

Thus, when the phase of the valve is advanced, interference may occur between the valve and the piston. Such interference needs to be avoided. In the following description, the term "advanced amount" indicates how much the phase of the valve is advanced relative to a reference phase. The reference phase is a phase for the case where the valve opens when the piston almost reaches the top dead center. The term "retarded amount" indicates how much the phase is retarded relative to the reference phase.

Figure 5:
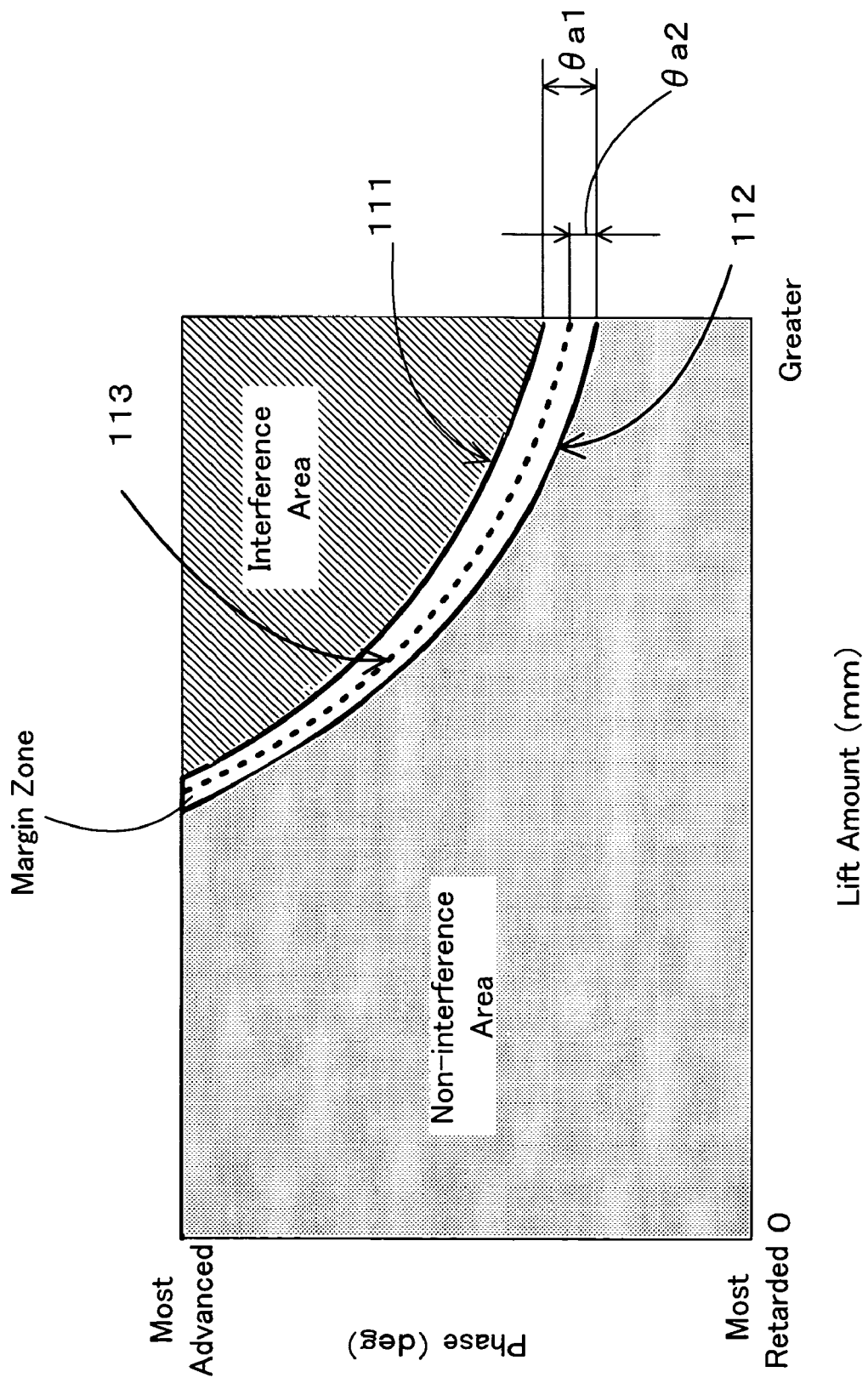
FIG. 5 graphically shows a relationship between a lift amount and a phase of a valve in accordance with one embodiment of the present invention.

FIG. 5 is a map illustrating a relationship between the lift amount and the phase of the valve. This map can be created, for example, through simulation or the like.

A horizontal axis of this map represents a lift amount (mm) of the valve, which ranges, for example, from 0 mm to 12 mm. A vertical axis represents a phase (degree) of the valve, which ranges, for example, from the most retarded amount (for example, −40 degrees) to the most advanced amount (for example, 80 degrees).

Reference numeral 111 shows an interference curve that indicates an interference value $\theta b$ of the phase at a given lift amount L. If the phase exceeds the interference value $\theta b$ when the lift amount of the valve is L, there is a possibility that interference occurs between the valve and the piston. A line-hatched area defined by the interference curve is referred to as an interference area.

Reference numeral 112 shows a non-interference curve that indicates a non-interference value $\theta s1$ of the phase at a given lift amount L. If the phase is equal to or smaller than the interference value $\theta s1$ when the lift amount of the valve is L, there is no possibility that interference occurs between the valve and the piston. A dot-hatched area defined by the non-interference curve 112 is referred to as a non-interference area.

As shown in FIG. 5, it is preferable that a margin zone is provided between the interference area and the non-interference area. A difference between the interference value $\theta b$ and the non-interference value $\theta s1$ is represented by $\theta a1$ (for example, 10 degrees).

A critical curve 113 (shown by a dotted line) drawn within the margin zone indicates a critical value $\theta s2$ (=$\theta s1+\theta a2$), which is determined by adding a predetermined margin value $\theta a2$ (<$\theta a1$) to the threshold value $\theta s1$. If the phase exceeds the critical value $\theta s2$, it indicates a risk that the valve may enter the interference area.

In order to avoid interference between the valve and the piston, in the present invention, the following two determination conditions are used.
1) whether or not a predicted value of the phase has deviated from the non-interference area.
2) whether or not an actually measured phase value (an actual phase) has deviated from the non-interference area.

According to the first condition 1), because the predicted value of the phase is used, it can be predicted that the valve will deviate from the non-interference area. If it is predicted that the valve will deviate from the non-interference area, an action for avoiding interference is activated. The interference avoiding action controls the lift amount and the phase so as to prevent the valve from actually deviating from the non-interference area.

By using the predicted value, deviation of the valve from the non-interference area can be prevented in advance. For example, even when the phase or the lift amount sharply overshoots, interference can be more surely avoided because deviation of the valve from the non-interference area due to the overshooting can be predicted.

According to the second condition 2), it can be determined whether or not the valve has actually deviated from the non-interference area. If the valve has deviated from the non-interference area, the interference avoiding action is activated to control the lift amount so that the valve returns to the non-interference area.

Determinations based on the two conditions are made independently each other. When at least one of the two conditions is met, the interference avoiding action is activated. Even when one of the variable lift mechanism and the variable phase mechanism does not operate normally due to a failure, interference can be more surely avoided by using these two determination conditions.

Alternatively, instead of the above first condition 1), the following condition may be used.
1) whether or not a predicted value of the phase has moved across the critical curve 113 to the interference area.

As described above, the critical curve 113 defines a value that is obtained by adding the margin value $\theta a2$ to the non-interference value $\theta s1$. Since the predicted value of the phase is used, the interference can be avoided even if the interference avoiding action is activated after it is determined that the predicted value has exceeded the critical curve 113 which is closer to the interference area.

Now, referring to two embodiments, a technique for avoiding the interference by using the above two conditions will be described. As to the first condition 1), the condition based on the critical curve 113 will be used in the following.

Embodiment 1

Figure 6:
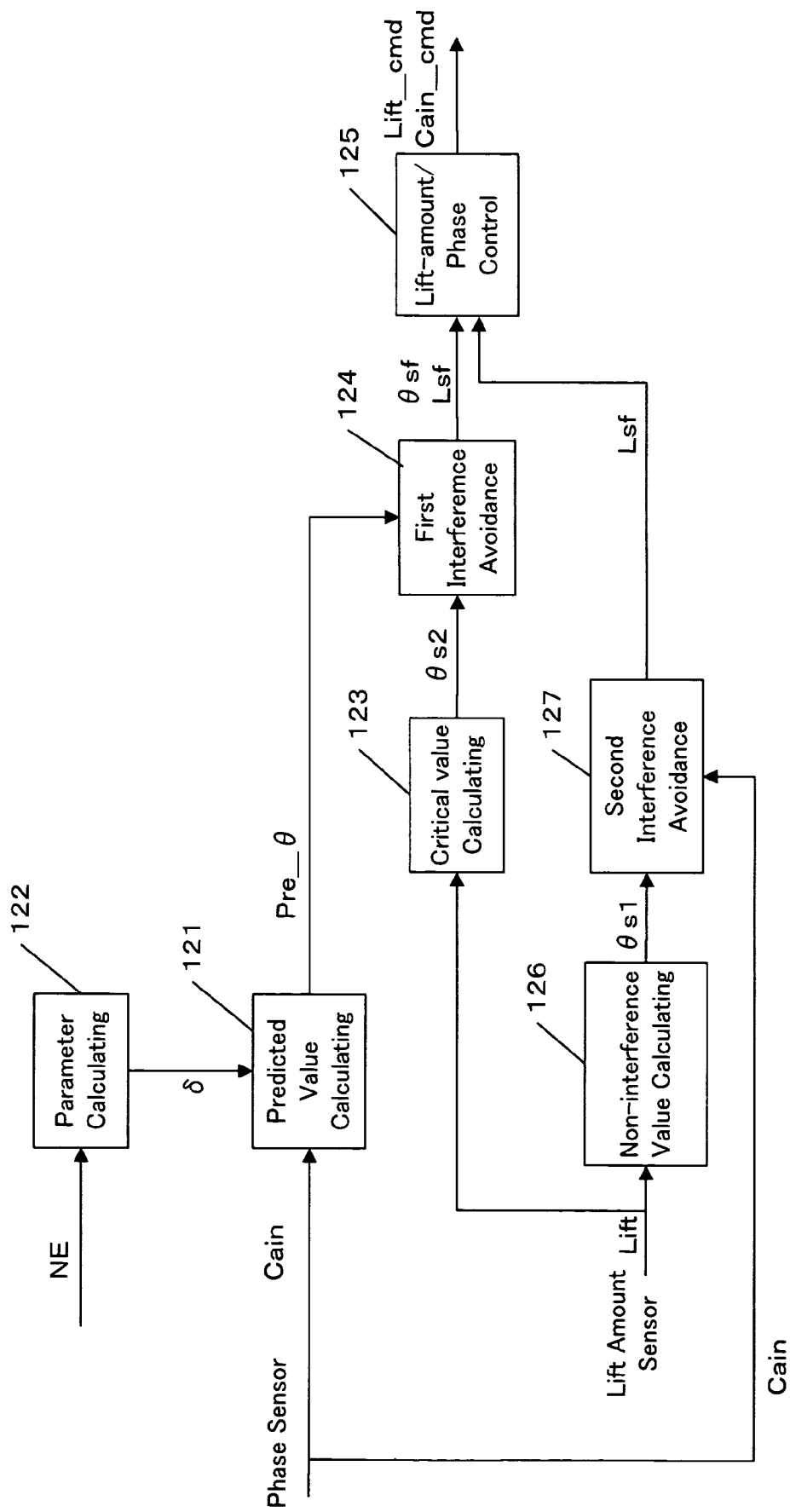
FIG. 6 is a block diagram of a control apparatus for avoiding interference in accordance with one embodiment of the present invention.

FIG. 6 shows a functional block diagram of a control apparatus in accordance with a first embodiment of the present invention. The functions of the blocks can be implemented in the ECU 1. In one embodiment, the functions are typically implemented by one or more computer programs stored in the memory 1c of the ECU 1. Alternatively, the functions may be implemented by software, hardware, firmware or any combination thereof.

A predicted value calculating unit 121 calculates a predicted value Pre_θ of the phase based on an actual phase Cain that is detected based on the output of the phase sensor 22 (FIG. 1), as shown by the equation (1). Specifically, the predicted value is determined by adding a phase change amount δt×(Cain(k)−Cain(k−1)) to the current actual phase value Cain(k).

$$Pre\_\theta = Cain(k) + \delta t \times (Cain(k) - Cain(k-1)) \quad (1)$$

A parameter δt indicates a cycle of the TDC signal. Since the actual phase Cain is calculated in a cycle of the TDC signal as described above, (Cain(k)−Cain(k−1)) represents the amount of change during one cycle of the TDC signal. It is preferable that the parameter δt is calculated based on the engine rotational speed NE that is detected based on the output of the crank angle sensor 17 (FIG. 1) because one cycle of the TDC signal changes depending on the engine rotational speed.

In this embodiment, a parameter calculating unit 122 calculates the parameter δt in accordance with the equation (2). The engine rotational speed NE represents the number of rotations per minute (rpm) and two TDC signals are transmitted per one engine rotation. Accordingly, the parameter δt is determined as shown by the equation (2).

$$\delta t = (60/2NE) \times 1000 \text{ (milliseconds)} \quad (2)$$

Figure 7:
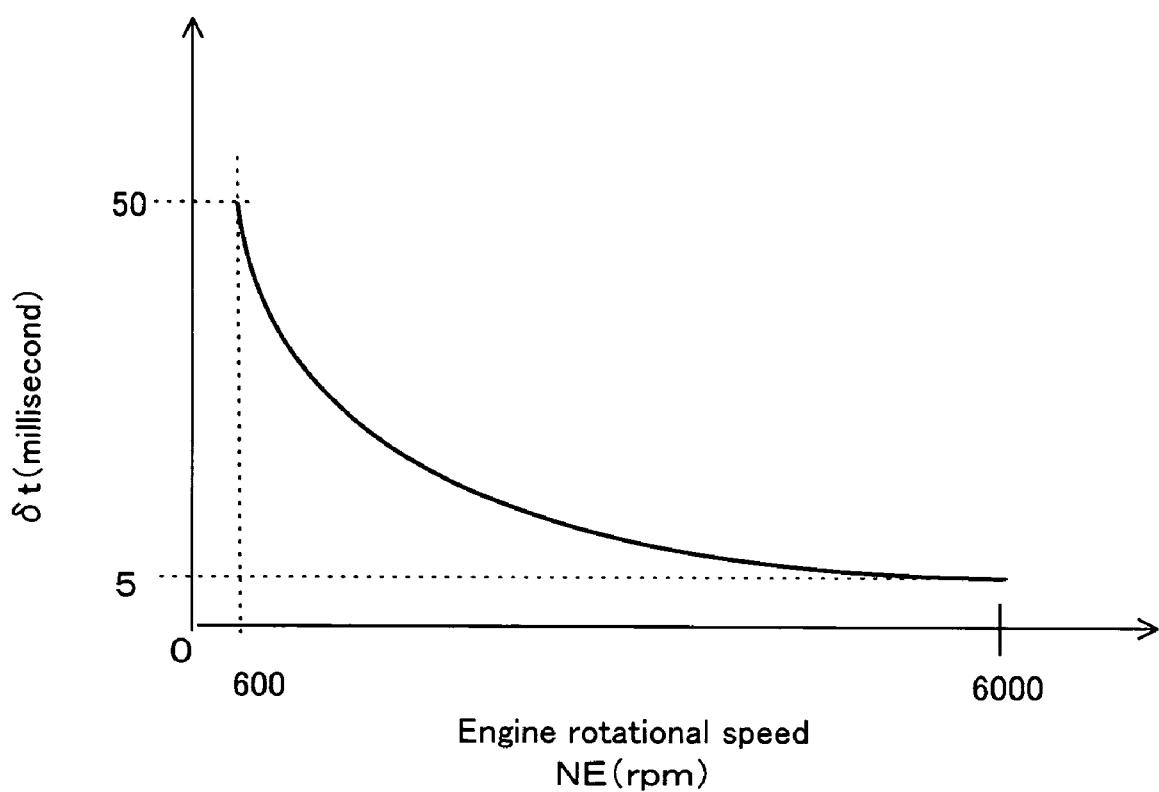
FIG. 7 graphically shows a map used for determining a predicted value of a phase in accordance with one embodiment of the present invention.

A relationship between the parameter δt and the engine rotational speed NE can be shown as a map of FIG. 7. Alternatively, the parameter calculating unit 122 may determine the parameter δt by referring to this map based on the engine rotational speed NE. The map can be stored, for example, in the memory 1c of the ECU 1 (FIG. 1).

A critical value calculating unit 123 receives an actually measured lift amount Lift detected by the lift amount sensor 21 (FIG. 1). The critical value calculating unit 123 refers to the critical curve 113 based on the actual lift amount Lift to determine the critical value θs2 (=non-interference value θs1+the margin value θa1) corresponding to the actual lift amount Lift.

Figure 8:
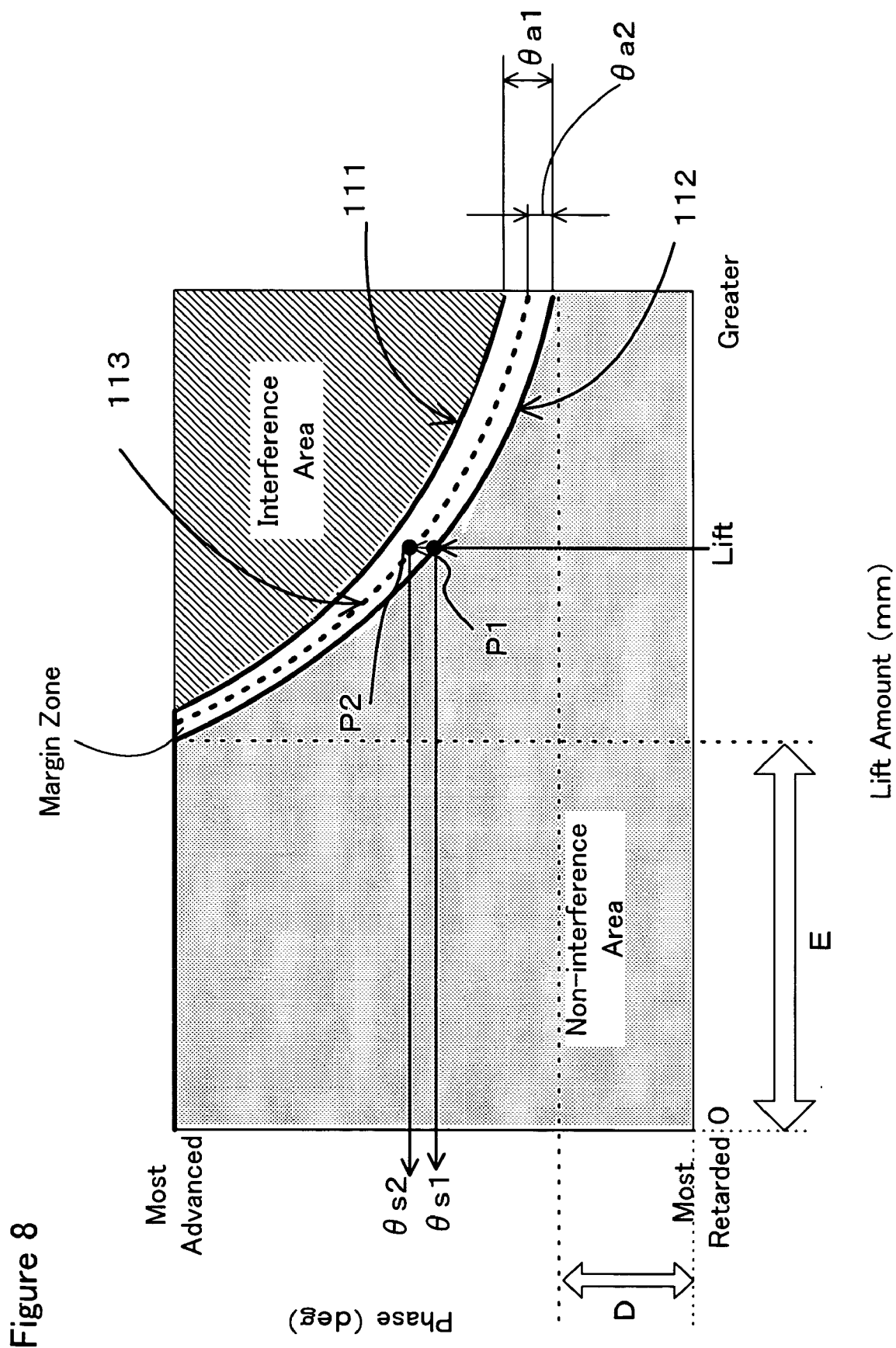
FIG. 8 graphically shows a lift-amount/phase map illustrating a point satisfying a first condition 1) and a point satisfying a second condition 2) in accordance with one embodiment of the present invention.

FIG. 8 shows a map similar to FIG. 5, which can be stored, for example, in the memory 1c of the ECU 1 (FIG. 1). In FIG. 8, the critical value θs2 corresponding to the actual lift amount Lift is shown by a point P2. If the valve exceeds the point P2, that is, if the phase at the lift amount Lift exceeds the critical value θs2, it indicates that the valve is approaching the interference area.

A first interference avoidance unit 124 makes a first determination based on the above first condition 1). Specifically, the critical value θs2 is compared with the predicted value Pre_θ of the phase. When the predicted value Pre_θ is equal to or greater than the critical value θs2, it is predicted that the valve will reach the interference area in the near future. In order to avoid occurrence of interference, the first interference avoidance unit 124 provides an interference avoidance value θsf of the phase to a lift-amount/phase control unit 125.

The interference avoidance value θsf of the phase is preferably set to a value that can prevent the interference at any lift amount. For example, referring to FIG. 8, when the phase is within a range D, no interference occurs at any lift amount. Therefore, the interference avoidance value θsf of the phase is set to a value (for example, the most retarded value) within the range D.

The lift-amount/phase control unit 125 sets the interference avoidance value θsf of the phase in a desired value Cain_cmd of the phase. The variable phase mechanism 27 (FIG. 1) controls the valve so that the phase of the valve converges to the desired value Cain_cmd. Thus, when it is predicted that the valve will reach the interference area in the near future, the phase is set to the interference avoidance value θsf so as to activate the interference avoiding action.

Furthermore, the first interference avoidance unit 124 provides an interference avoidance value Lsf of the lift amount to the lift-amount/phase control unit 125. The interference avoidance value Lsf of the lift amount is preferably set to a value that can prevent interference at any phase. For example, referring to FIG. 8, when the lift amount is within a range E, no interference occurs at any phase. Therefore, the interference avoidance value Lsf of the lift amount is set to a value (for example, 2 mm) within the range E.

The lift-amount/phase control unit 125 sets the interference avoidance value Lsf in a desired value Lift_cmd of the lift amount. The variable lift mechanism 26 (FIG. 1) controls the valve so that the lift amount of the valve converges to the desired value Lift_cmd. Thus, when it is predicted that the valve will reach the interference area in the near future, the lift amount is set to the interference avoidance value Lsf so as to activate the interference avoiding action.

Since it can be predicted that the valve will approach the interference area through use of the predicted value of the phase, the interference avoiding action can be activated before the valve actually approaches the interference area.

Since the determination for the interference avoiding action is based on the predicted value of the phase, it is preferable to cause both of the phase and the lift amount to converge to their corresponding interference avoidance values. Even if some error is included in the predicted value, the interference can be more surely avoided by controlling both of the phase and the lift amount to the interference avoidance values. Further, the fact that the predicted value of the phase reaches the critical value implies a possibility that the phase will abruptly change due to a failure in the variable phase mechanism or the cam-driving system of the engine. In particular, when a failure occurs in the variable phase mechanism that electromagnetically changes the phase, as shown in FIG. 3, the phase may abruptly change toward the most advanced value or the most retarded value even if the phase is controlled to the interference avoidance value. If the lift amount is allowed to freely change under such situation, the interference avoidance action may be delayed. By controlling both of the phase and the lift amount to the interference avoidance values, such situation where the interference avoidance is delayed can be prevented.

However, alternatively, only one of the phase and the lift amount may be caused to converge to the interference avoidance value. For example, when a convergence speed of the lift amount to a desired value is sufficiently fast, the interference is avoided by controlling the phase to the interference avoidance value.

In a further alternative embodiment, the interference avoidance action may be activated when deviation of the valve from the non-interference area is predicted as a result of comparison between the predicted value and the non-interference value. In this case, the predicted value Pre_θ of the phase is compared with the non-interference value θs1. If the predicted value Pre_θ of the phase is equal to or greater than the non-interference value θs1, the phase is caused to converge to the interference avoidance value θsf.

Referring back to FIG. 6, a non-interference value calculating unit 126 refers to the non-interference curve 112 based on the actual lift amount Lift to determine the non-interference value θs1 corresponding to the actual lift amount Lift.

In FIG. 8, the non-interference value θs1 corresponding to the actual lift amount Lift is shown by a point P1. If the valve exceeds the point P1, that is, if the phase at the lift amount Lift exceeds the non-interference value θs1, it indicates that the valve has deviated from the non-interference area.

A second interference avoidance unit 127 makes a second determination based on the above second condition 2). Specifically, the second interference avoidance unit 127 compares the actual phase Cain with the non-interference value θs1. If the actual phase Cain is equal to or greater than the non-interference value θs1, it indicates that the valve has actually deviated from the non-interference area. The second interference avoidance unit 127 provides an interference avoidance value Lsf of the lift amount to the lift-amount/phase control unit 125 so as to activate the interference avoiding action.

The interference avoidance value Lsf of the lift amount is set to a value that can prevent interference at any phase, as described above. The lift-amount/phase control unit 125 sets the interference avoidance value Lsf in a desired value Lift_cmd of the lift amount. The variable lift mechanism 26 (FIG. 1) controls the valve so that the lift amount of the valve converges to the desired value Lift_cmd. Thus, when it is detected that the valve has deviated from the non-interference area, the lift amount is set to the interference avoidance value Lsf so that the valve can return to the non-interference area.

The fact that the valve has deviated from the non-interference area typically implies a possibility that a failure occurs in the variable lift mechanism. In the variable lift mechanism, the lift amount generally does not exhibit an abrupt change because a reactive force received from the cam to the link mechanism and a friction are generally large. Therefore, even when only the lift amount is controlled to the interference avoidance value, there is no possibility of interference after the interference avoiding action.

Alternatively, the valve may be returned to the non-interference area by controlling only the phase to the interference avoidance value or by controlling both of the lift amount and the phase to the interference avoidance values. One of the lift amount and the phase may be selected depending on the convergence speed to a desired value and the selected one is controlled to the interference avoidance value.

After the lift amount is set to the interference avoidance value, it is preferable that the lift amount thus set is kept until a reset action for the variable lift mechanism 26 is performed. Similarly, after the phase is set to the interference avoidance value, it is preferable that the phase thus set is kept until a reset action for the variable phase mechanism 27 is performed. Such a reset action may be performed by using a device (for example, a diagnostic device such as a PGM tester) or by manual reset operation such as cancellation of a battery. If a reset action is performed, the variable lift mechanism 26 and the variable phase mechanism 27 return to their respective initial states. If the interference avoidance action is erroneously cancelled when a failure occurs in the variable lift mechanism or the variable phase mechanism, the engine may be damaged. By keeping the lift amount or the phase at the interference avoidance value until the reset action is performed, such erroneous cancellation can be prevented.

Thus, according to the present invention, the interference avoiding action can be activated without a delay because the predicted value of the phase is used to predict that the valve will approach the interference area. Because it is predicted that the valve will approach the interference area, the size of the margin zone can be minimized, which allows a wider driving range of the valve. Such a wider driving range of the valve allows the lift amount and the phase to be held at optimal values. As a result, a better fuel efficiency and a decreased pumping loss can be maintained. Since the size of the recess at the upper portion of the piston can be minimized, the combustion efficiency can be prevented from reducing.

Figure 9:
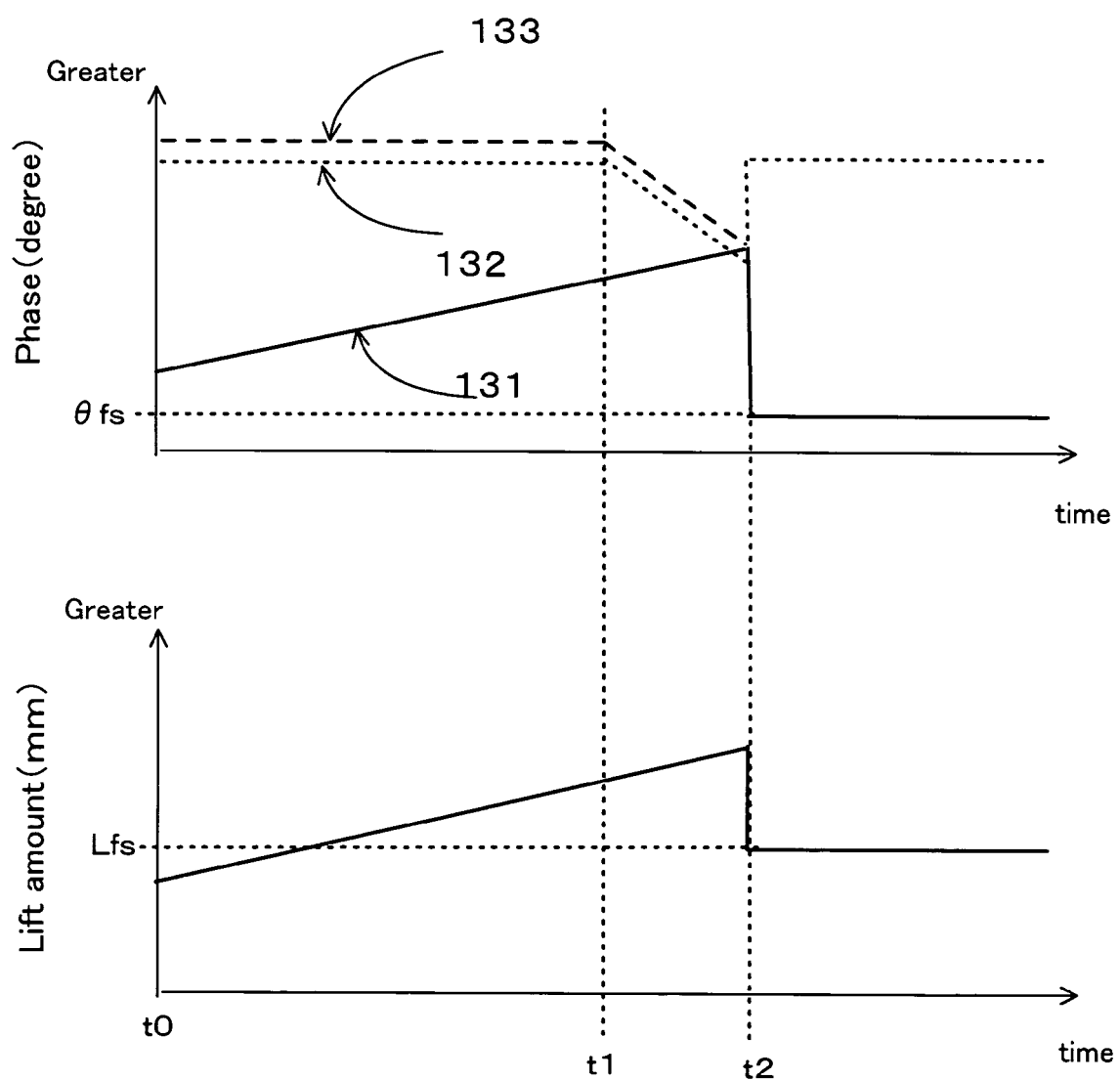
FIG. 9 graphically shows behaviors of a valve and a piston when a first condition 1) is satisfied in accordance with one embodiment of the present invention.

FIG. 9 shows a behavior of the valve when the first condition 1) is met in accordance with one embodiment of the present invention. The predicted value Pre_θ of the phase is represented by line 131. From time t0 to t1, the predicted values Pre_θ of the phase increases as the lift amount increases. Line 132 represents the non-interference value θs1 based on the non-interference curve 112 of FIG. 8. Line 133 represents the critical value θs2 based on the critical curve 113 of FIG. 8. At time t1, the non-interference value θs1 and the critical value θs2 start to decrease. The lift amount at time t1 corresponds to the upper limit value of the range E shown in FIG. 8.

When the predicted value Pre_θ of the phase reaches the critical value θs2 at time t2, the first condition 1) is met. It is predicted that the valve will reach the interference area and the interference avoiding action is activated. In this example, the lift amount and the phase are controlled to become the corresponding interference avoidance values Lfs and θfs in response to the activation of the interference avoiding action.

Figure 10:
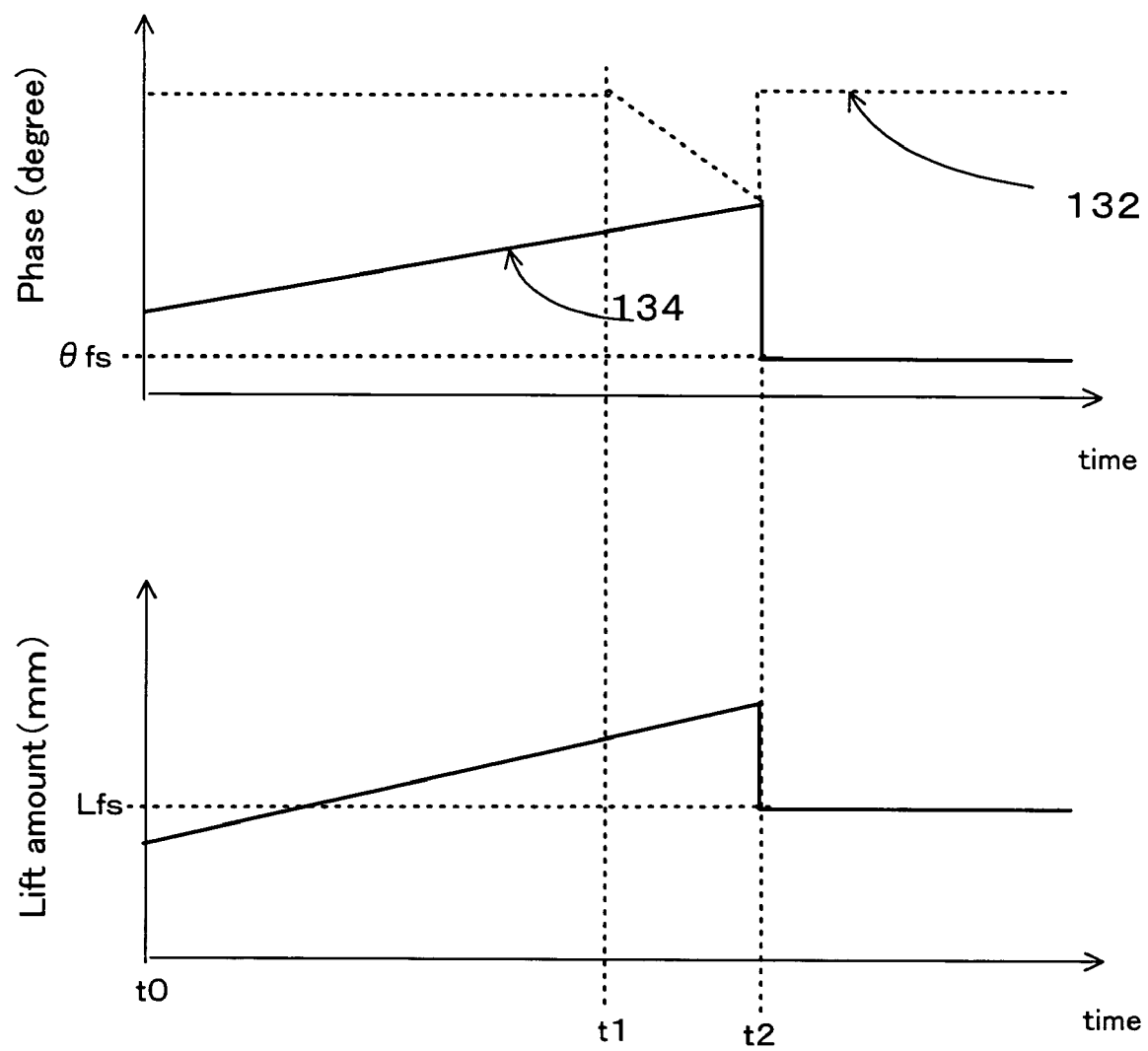
FIG. 10 graphically shows behaviors of a valve and a piston when a second condition 2) is satisfied in accordance with one embodiment of the present invention.

FIG. 10 shows a behavior of the valve when the second condition 2) is met in accordance with one embodiment of the present invention. The actual phase Cain is represented by line 134. From time t0 to t1, the actual phase Cain increases as the lift amount increases. Line 132 represents the non-interference value θs1 based on the non-interference curve 112 of FIG. 8. At time t1, the non-interference value θs1 starts to decrease. The lift amount at time t1 corresponds to the upper limit value of the range E shown in FIG. 8.

When the actual phase Cain reaches the non-interference value θs1 at time t2, the second condition 2) is met. It is determined that the valve has deviated from the non-interference area and the interference avoiding action is activated. In this example, both of the lift amount and the phase are controlled to become the corresponding interference avoidance values Lfs and θfs in response to the activation of the interference avoiding action.

Figure 11:
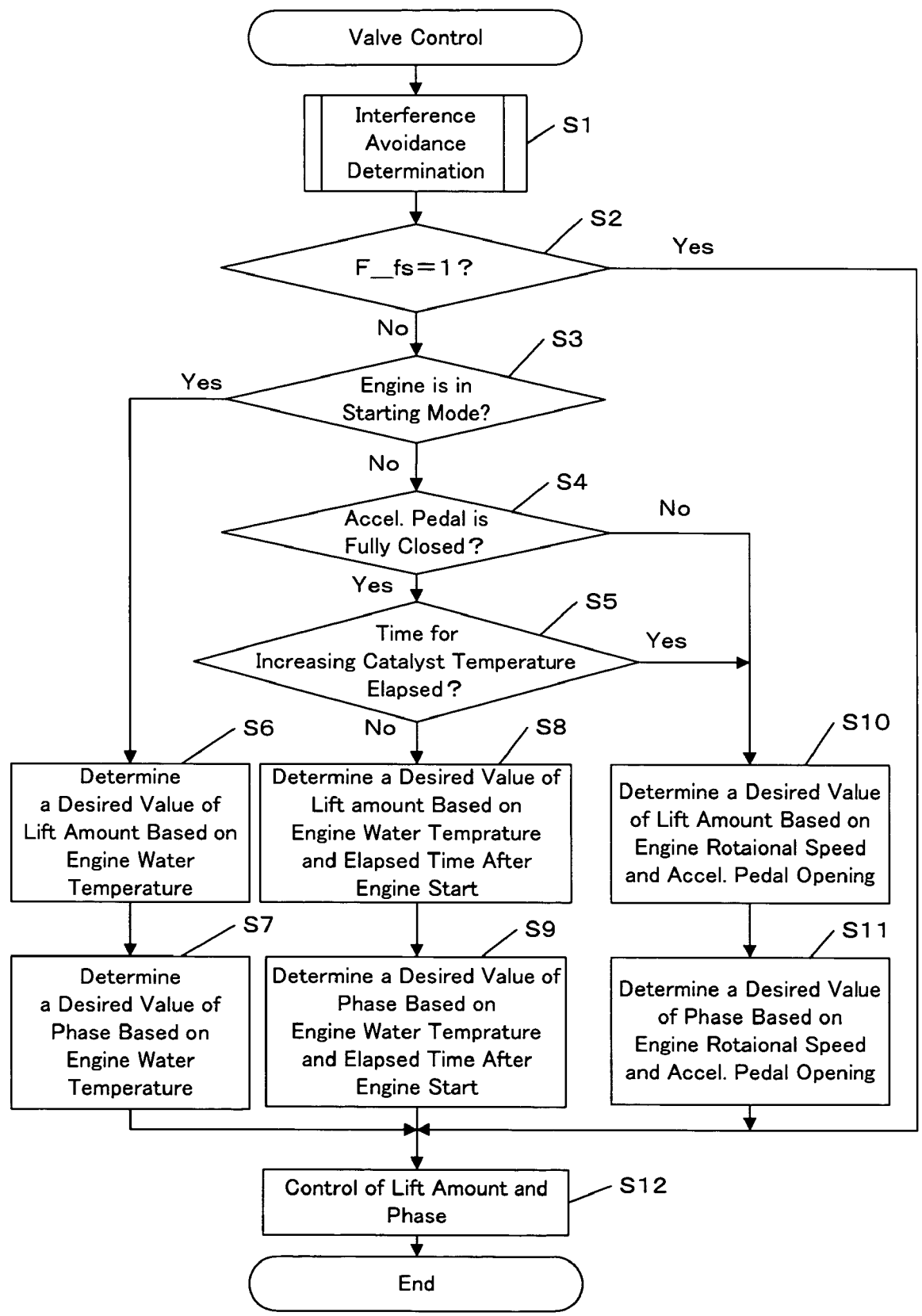
FIG. 11 is a flowchart of a process for controlling a lift amount and phase in accordance with one embodiment of the present invention.

FIG. 11 is a flowchart of a process for controlling the valve in accordance with the first embodiment. This process is performed at a predetermined time interval (for example, five milliseconds).

In step S1, an interference avoidance determination routine (FIG. 12) is performed. In step S2, a flag F_fs is examined. This flag is to be set to a value of 1 when the interference avoiding action is activated in the interference avoidance determination routine. If F_fs=1, the process proceeds to step S12, in which the valve is controlled through the variable lift mechanism 26 and the variable phase mechanism 27 so that desired values calculated to avoid the interference can be achieved for the lift amount and the phase.

Figure 13:
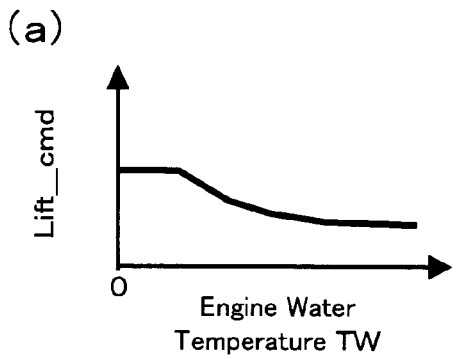
FIG. 13 graphically shows a map used for determining a desired lift amount and a desired phase during an engine start in accordance with one embodiment of the present invention.
Figure 13:
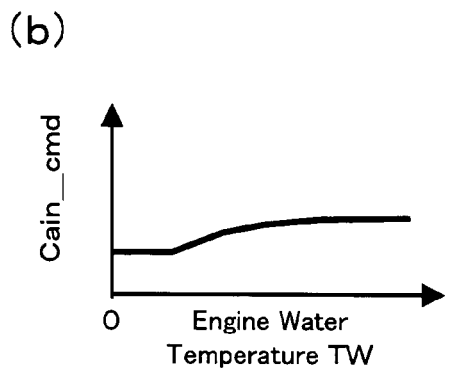

In step S3, it is determined whether the engine is in a starting mode. If the engine is in the starting mode, a map as shown in FIG. 13(a) is referred to based on the engine water temperature TW detected by the engine water temperature sensor 23 (FIG. 1) to determine a desired value Lift_cmd of the lift amount (S6). A map shown in FIG. 13(b) is referred to based on the engine water temperature TW to determine a desired value Cain_cmd of the phase (S7). These maps can be stored in the memory 1c (FIG. 1).

Figure 14:
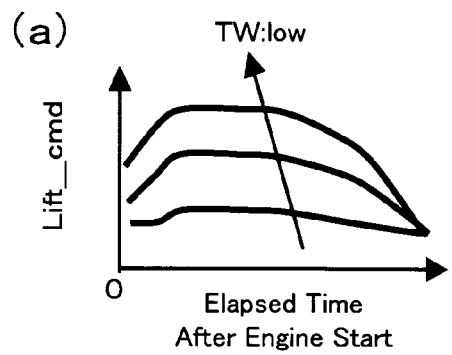
FIG. 14 graphically shows a map used for determining a desired lift amount and a desired phase during a catalyst warming process in accordance with one embodiment of the present invention.
Figure 14:
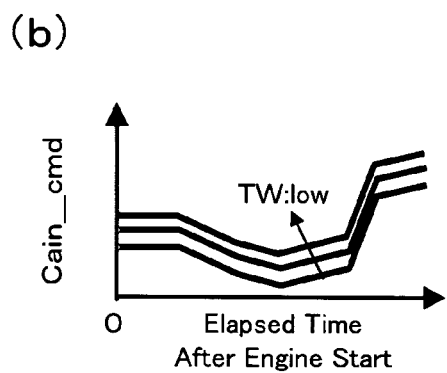

If the decision in step S3 is No, the output of the accelerator pedal sensor 24 (FIG. 1) is examined to determine whether the accelerator pedal is fully closed (S4). If the accelerator pedal is fully closed, it indicates that the engine is idling. Then, in step S5, it is determined whether a predetermined time that is set so as to perform a catalyst temperature increasing control has elapsed. If the predetermined time has not elapsed, it indicates that the catalyst temperature increasing control is underway. The catalyst temperature increasing control is a control for activating the catalyst by temporarily increasing air introduced into the engine. In step S8, a desired value Lift_cmd of the lift amount is determined by referring to a map shown in FIG. 14(a) based on the elapsed time after the engine start and the engine water temperature TW. Furthermore, a desired value Cain_cmd of the phase is determined by referring to a map shown in FIG. 14(b) based on the elapsed time after the engine start and the engine water temperature TW. These maps can be stored in the memory 1c (FIG. 1).

Figure 15:
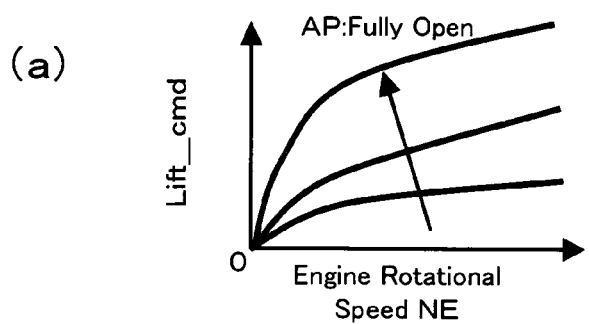
FIG. 15 graphically shows a map used for determining a desired lift amount and a desired phase after a catalyst warming process in accordance with one embodiment of the present invention.
Figure 15:
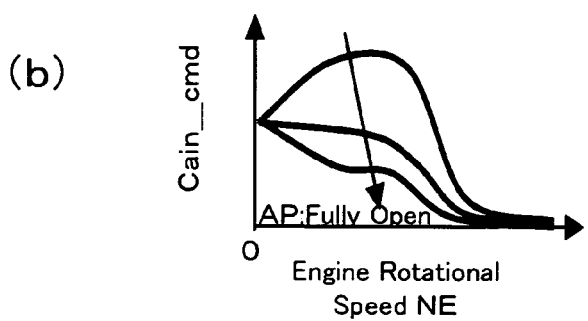

If it is determined in step S5 that the catalyst temperature increasing control has completed, it indicates that the engine is in a warm condition. In step S10, a desired value Lift_cmd of the lift amount is determined by referring to a map shown in FIG. 15(a) based on the engine rotational speed NE detected from the crank angle sensor 17 (FIG. 1) and the accelerator pedal opening angle AP detected by the accelerator pedal opening sensor 24 (FIG. 1). In addition, a desired value Cain_cmd of the phase is determined by referring to a map shown in FIG. 15(b) based on the engine rotational speed NE and the accelerator pedal opening AP. These maps can be stored in the memory 1c (FIG. 1).

In step S12, the valve is controlled through the variable lift mechanism 26 and the variable phase mechanism 27 so that the desired value of the lift amount and the desired value of the phase determined in steps S6 through S11 can be achieved.

Figure 12:
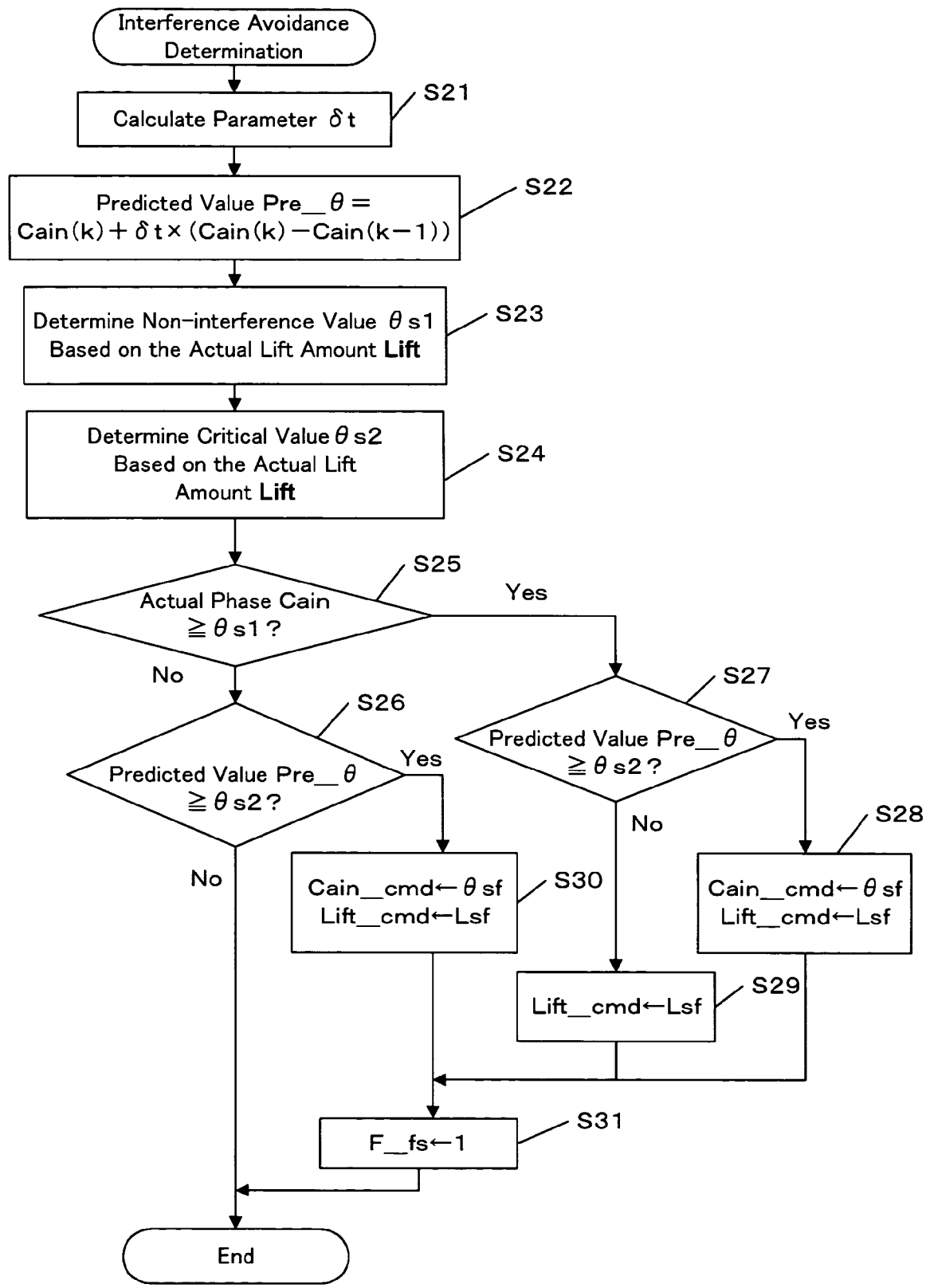
FIG. 12 is a flowchart of a process for determining interference avoidance in accordance with one embodiment of the present invention.

FIG. 12 shows the interference avoidance determination routine performed in step S1 of FIG. 11. In step S22, the parameter δt is calculated in accordance with the above equation (2) or by referring to a map as shown in FIG. 7. In step S21, the predicted value Pre_θ of the phase is calculated in accordance with the above equation (1). In step S23, the non-interference value θs1 is determined by referring to the non-interference curve 112 in the map of FIG. 8, which is stored, for example, in the memory 1c, based on the actual lift amount Lift detected by the lift amount sensor 21 (FIG. 1). In step S24, the critical value θs2 is determined by referring to the critical curve 113 in the map of FIG. 8 based on the actual lift amount Lift.

In step S25, the actual phase Cain detected based on the output of the phase sensor 22 (FIG. 1) is compared with the non-interference value θs1. In step S27, the critical value θs2 and the predicted value Pre_θ are compared.

If the decision of step S25 is Yes and the decision of step S27 is Yes, it indicates that the valve has actually deviated from the non-interference area and it is predicted that the valve will reach the interference area. In this case, in step S28, the interference avoidance values θsf and Lsf are set in the desired value Cain_cmd of the phase and the desired value Lift_cmd of the lift amount, respectively. In step S31, a value of 1 is set in the flag F_fs so as to activate the interference avoiding action.

If the decision of step S25 is Yes and the decision of step S27 is No, it is predicted that the valve will not reach the interference area but it indicates that the valve has actually deviated from the non-interference area. In step S29, the avoidance value Lsf is set in the desired value Lift_cmd of the lift amount, so that the valve can return to the non-interference area. In this case, the desired value Cain_cmd of the phase can be set in accordance with, for example, the map of FIG. 15(b). In step S31, a value of 1 is set in the flag F_fs so as to activate the interference avoiding action.

If the decision of step S25 is No, the predicted value is compared with the critical value θs2 in step S26. If the decision of step S25 is No and the decision of step S26 is Yes, it is predicted that the valve will reach the interference area in the near future although the valve has not actually deviated from the non-interference area. In step S30, in order to prevent an occurrence of interference in the near future, the interference avoidance values Lfs and θfs are set in the desired value Lift_cmd of the lift amount and the desired values Cain_cmd of the phase, respectively. In step S31, a value of 1 is set in the flag F_fs so as to activate the interference avoiding action.

If the decision of step S25 is No and the decision of step S26 is No, the valve is currently within the non-interference area and the predicted position of the valve is also within the non-interference area. Therefore, it is determined that no interference occurs. The process exits this routine.

Embodiment 2

Figure 16:
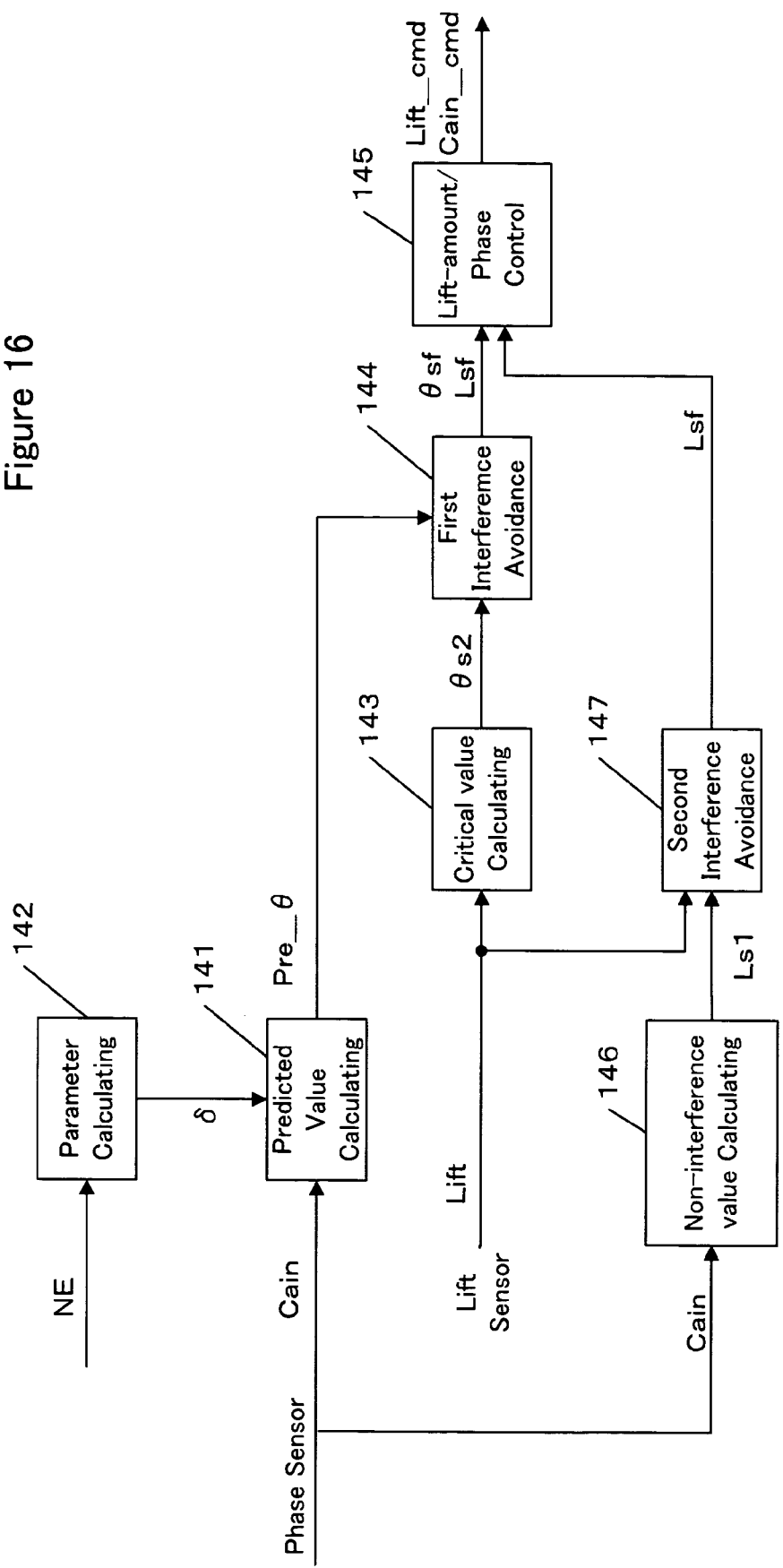
FIG. 16 is a block diagram of a control apparatus for avoiding interference in accordance with another embodiment of the present invention.

FIG. 16 shows a functional block diagram of a control apparatus in accordance with a second embodiment of the present invention. Similarly to the first embodiment, functions of the blocks can be implemented in the ECU 1.

The second embodiment is essentially based on the same principle as the first embodiment. In the second embodiment, determining the second condition 2) is slightly different from the first embodiment.

A predicted value calculating unit 141, a parameter calculating unit 142, a critical value calculating unit 143 and a first interference avoidance unit 144 perform in a similar way to the corresponding units in FIG. 6.

Figure 17:
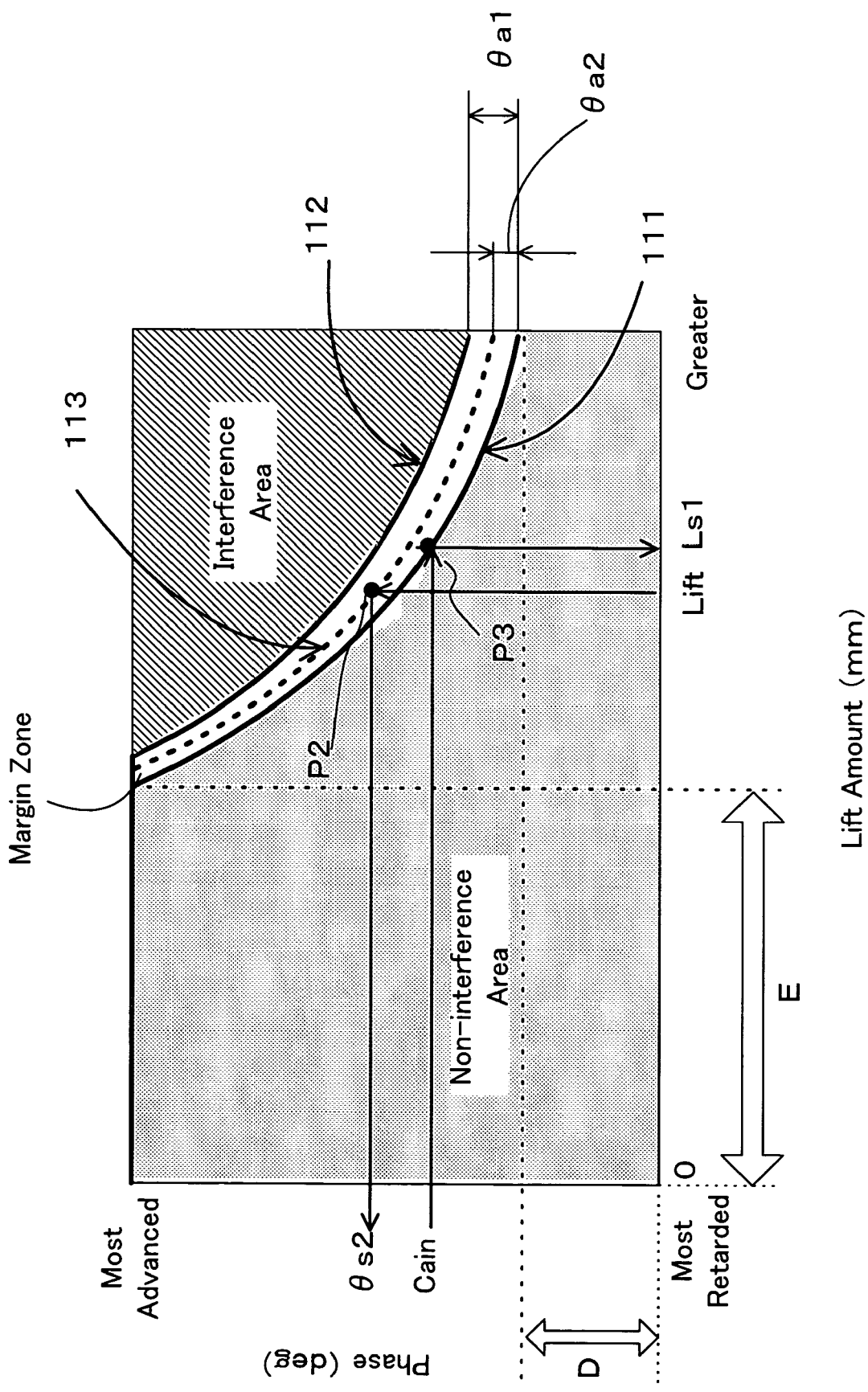
FIG. 17 graphically shows a lift-amount/phase map illustrating a point satisfying a first condition 1) and a point satisfying a second condition 2) in accordance with another embodiment of the present invention.

FIG. 17 shows a map similar to FIG. 5. Similarly to the first embodiment (FIG. 8), the critical value θs2 corresponding to the actual lift amount Lift is represented by a point P2. If the valve exceeds the point P2, that is, if the phase at the lift amount Lift exceeds the critical value θs2, it is predicted that the valve will reach the interference area. The first interference avoidance unit 144 provides the interference avoidance values θsf and Lsf of the lift amount and the phase to a lift-amount/phase control unit 145. As described above, the avoidance value θsf of the phase is set to a value that causes no interference at any lift amount. That is, it is set to a value within the range D. The avoidance value Lsf of the lift amount is set to a value that causes no interference at any phase. That is, it is set to a value within the range E.

Referring back to FIG. 16, a non-interference value calculating unit 146 receives the actual phase Cain detected based on the output of the phase sensor 22 (FIG. 1). The non-interference value calculating unit 146 refers to the non-interference curve 112 based on the actual phase Cain to determine the lift amount Ls1 corresponding to the actual phase Cain as a non-interference value.

In FIG. 17, the non-interference value Ls1 corresponding to the actual phase Cain is represented by a point P3. If the valve exceeds the point P3, that is, if the lift amount at the phase Cain exceeds the non-interference value Ls1, it indicates that the valve has actually deviated from the non-interference area.

A second interference avoidance unit 147 makes a second determination based on the above second condition 2). Specifically, the second interference avoidance unit 147 compares the actual lift amount Lift detected by the lift amount sensor 21 (FIG. 1) with the non-interference value Ls1. If the actual lift amount Lift is equal to or greater than the non-interference value Ls1, it indicates that the valve has deviated from the non-interference area. In order to activate an interference avoiding action, the second interference avoidance unit 147 provides the interference avoidance value Lsf of the lift amount to the lift-amount/phase control unit 145.

The lift-amount/phase control unit 145 sets the interference avoidance value Lsf of the lift amount in a desired value Lift_cmd of the lift amount. The variable lift mechanism 26 (FIG. 1) controls the valve so that the lift amount of the valve converges to the desired value Lift_cmd. Thus, if the valve has deviated from the non-interference area, the lift amount is set to the interference avoidance value Lsf so that the valve can return to the non-interference area.

Thus, the second embodiment determines the non-interference value from the actual lift amount whereas the first embodiment determines the non-interference value from the actual phase. The principle for detecting the deviation of the valve from the non-interference area by using the non-interference value is same in both embodiments.

The behavior shown in FIG. 9 can be similarly applied to the second embodiment. The behavior shown in FIG. 10 can be similarly to the second embodiment except that the interference avoiding action is activated when the lift amount Lift reaches the non-interference value Ls1.

Figure 18:
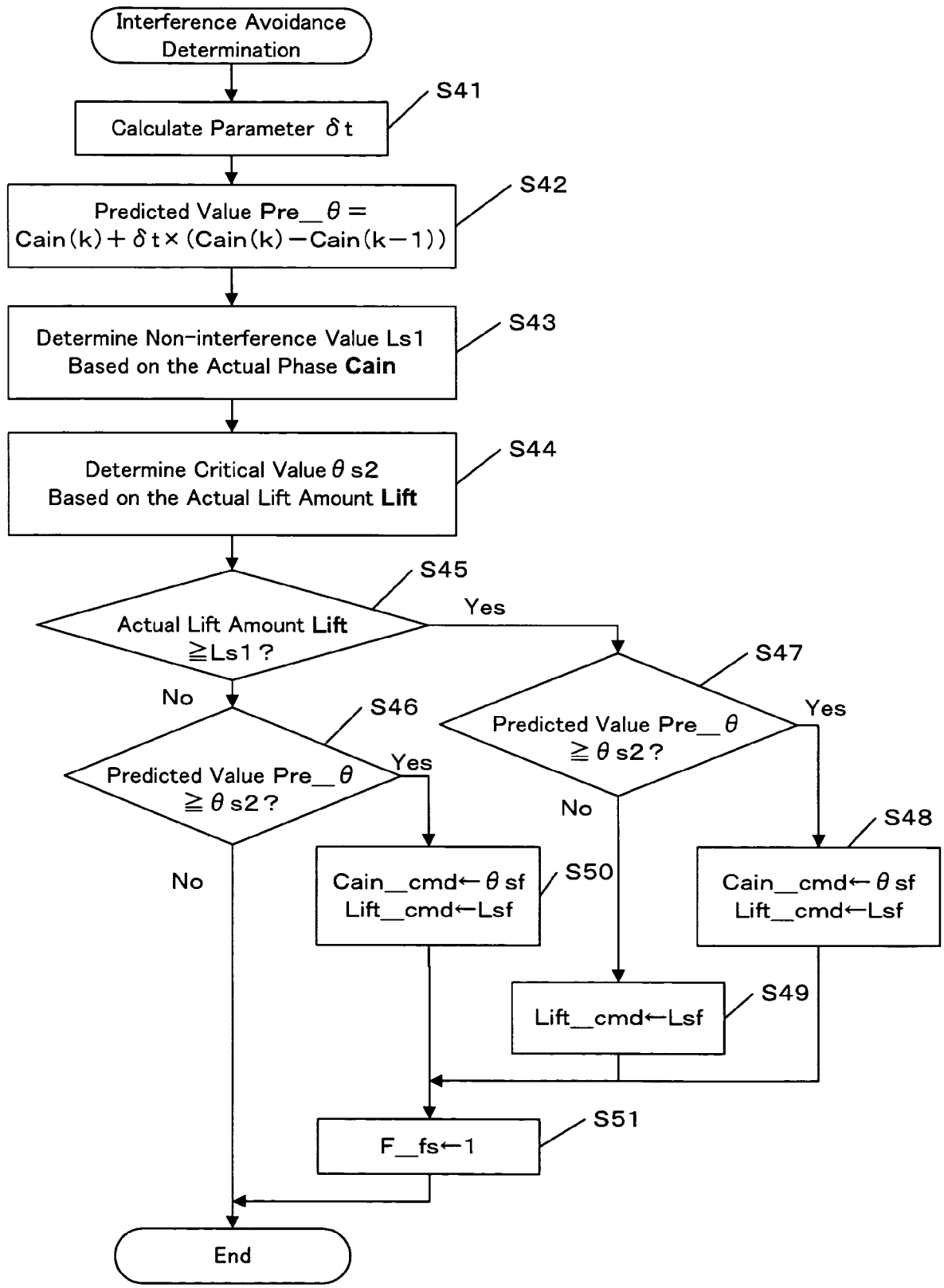
FIG. 18 is a flowchart of a process for determining interference avoidance in accordance with another embodiment of the present invention.

The flowchart for the valve control process shown in FIG. 11 is similarly applied to the second embodiment. FIG. 18 shows the interference avoidance determination routine in accordance with the second embodiment. Operations in steps S43 and S45 of this routine are different from the interference avoidance determination routine of FIG. 12 of the first embodiment.

In step S43, the interference value Ls1 is determined by referring to the non-interference curve 112 in the map as shown in FIG. 17, which is stored, for example, in the memory 1c (FIG. 1), based on the actual phase Cain that is detected from the output of the phase sensor 22 (FIG. 1). In step S45, the non-interference value Ls1 thus determined is compared with the lift amount detected by the lift amount sensor 21 (FIG. 1) to determine whether or not the valve has deviated from the non-interference area.

Since operations in the other steps S41-S42, S44 and S46-S51 are the same as steps S21-S22, S24 and S26-S31 described referring to FIG. 12, description of these operations is omitted.

In the above-described first and second embodiments, the predicted value is determined for the phase. For example, in a variable phase mechanism as shown in FIG. 3, the changing speed of the phase is fast because the phase is electromagnetically changed. Since the actual phase is calculated in accordance with the TDC cycle, the time interval for obtaining the actual phase may be longer as the engine rotational speed decreases. If such time interval is long, an abrupt change may occur between the previous value and the current value of the actual phase, which may result in a delay in activating the interference avoiding action. Since the current value of the phase can be predicted by calculating the predicted value of the phase, such a delay can be prevented.

Alternatively, a predicted value of the lift amount can be calculated and the approach of the valve to the interference area can be predicted based on the predicted value. The predicted value of the lift amount can be calculated, for example, by replacing the actual phase in the equation (1) with the actual lift amount and setting the time parameter δt to the time interval at which the lift amount is detected. If the predicted value of the lift amount exceeds the non-interference curve or the critical curve, the interference avoiding action is activated.

The present invention can be applied to a general-purpose engine (for example, a vessel-propelling engine such as an outboard motor).

What is claimed is:

1. A control apparatus for avoiding interference between a valve and a piston of an engine, the engine having a variable lift mechanism for changing a lift amount of the valve and a variable phase mechanism for changing a phase of the valve, comprising a control unit configured to:
    calculate a predicted value of the phase;
    make a first determination of whether an actually measured value of the phase has exceeded a first predetermined value;
    make a second determination of whether the predicted value has exceeded a second predetermined value;
    change at least one of the lift amount and the phase to avoid the interference if it is determined by the first determination that the actually measured value of the phase has exceeded the first predetermined value or if it is determined by the second determination that the predicted value has exceeded the second predetermined value.

2. The control apparatus of claim 1, wherein the control unit is further configured to set at least one of the lift amount and the phase to an interference avoidance value to avoid the interference,
    wherein the interference avoidance value for the lift amount indicates a lift amount that can avoid the interference at any phase and the interference avoidance value for the phase indicates a phase that can avoid the interference at any lift amount.

3. The control apparatus of claim 1, wherein the control unit is further configured to determine as the second predetermined value a limit value of the phase at which no interference occurs based on an actually measured value of the lift amount.

4. The control apparatus of claim 1, wherein the control unit is further configured to determine as the first predetermined value a limit value of the phase at which no interference occurs based on an actually measured value of the lift amount.

5. The control apparatus of claim 1, wherein the control unit is further configured to:
    if the lift amount is changed to avoid the interference, keep the changed lift amount at least until the variable lift mechanism is reset; and
    if the phase is changed to avoid the interference, keep the changed phase at least until the variable phase mechanism is reset.

6. The control apparatus of claim 1, wherein the predicted value is calculated based on an amount of change of the actually measured value of the phase.

7. The control apparatus of claim 6, wherein the predicted value is calculated based on a rotational speed of the engine.

8. A control apparatus for avoiding interference between a valve and a piston of an engine, the engine having a variable lift mechanism for changing a lift amount of the valve and a variable phase mechanism for changing a phase of the valve, comprising a control unit configured to:

calculate a predicted value of the phase;

make a first determination of whether the predicted value has exceeded a first predetermined value; and change at least one of the lift amount and the phase to avoid the interference if it is determined that the predicted value has exceeded the first predetermined value, wherein the control unit is further configured to:

determine, based on an actually measured value of the lift amount, a limit value of the phase at which no interference occurs; and determine as the first predetermined value a value obtained by adding the limit value to a predetermined margin value.

9. A control apparatus for avoiding interference between a valve and a piston of an engine, the engine having a variable lift mechanism for changing a lift amount of the valve and a variable phase mechanism for changing a phase of the valve, comprising a control unit configured to:

calculate a predicted value of the phase;

make a first determination of whether an actually measured value of the lift amount has exceeded a first predetermined value;

make a second determination of whether the predicted value has exceeded a second predetermined value; and change at least one of the lift amount and the phase to avoid the interference if it is determined by the first determination that the actually measured value of the lift amount has exceeded the first predetermined value or if it is determined by the second determination that the predicted value has exceeded the second predetermined value.

10. The control apparatus of claim 9, wherein the control unit is further configured to determine as the first predetermined value a limit value of the lift amount at which no interference occurs based on an actually measured value of the phase.

11. A control apparatus for avoiding interference between a valve and a piston of an engine, the engine having a variable lift mechanism for changing a lift amount of the valve and a variable phase mechanism for changing a phase of the valve, comprising a control unit configured to:

calculate a predicted value of the lift amount;

make a first determination of whether an actually measured value of the lift amount has exceeded a first predetermined value;

make a second determination of whether the predicted value has exceeded a second predetermined value; and change at least one of the lift amount and the phase to avoid the interference if it is determined by the first determination that the actually measured value of the lift amount has exceeded the first predetermined value or if it is determined by the second determination that the predicted value has exceeded the second predetermined value.

12. A method for avoiding interference between a valve and a piston of an engine, the engine having a variable lift mechanism for changing a lift amount of the valve and a variable phase mechanism for changing a phase of the valve, comprising:

calculating a predicted value of the phase;

making a first determination of whether an actually measured value of the phase has exceeded a first predetermined value;

making a second determination of whether the predicted value has exceeded a second predetermined value; and changing at least one of the lift amount and the phase to avoid the interference if it is determined by the first determination that the actually measured value of the phase has exceeded the first predetermined value or if it is determined by the second determination that the predicted value has exceeded the second predetermined value.

13. The method of claim 12, further comprising setting at least one of the lift amount and the phase to an interference avoidance value to avoid the interference, wherein the interference avoidance value for the lift amount indicates a lift amount that can avoid the interference at any phase and the interference avoidance value for the phase indicates a phase that can avoid the interference at any lift amount.

14. The method of claim 12, further comprising:

determining, based on an actually measured value of the lift amount, a limit value of the phase at which no interference occurs; and setting the limit value in the second predetermined value.

15. The method of claim 12, further comprising:

determining, based on an actually measured value of the lift amount, a limit value of the phase at which no interference occurs;

and setting the limit value in the first predetermined value.

16. The method of claim 12, further comprising:

if the lift amount is changed to avoid the interference, keeping the changed lift amount at least until the variable lift mechanism is reset; and if the phase is changed to avoid the interference, keeping the changed phase at least until the variable phase mechanism is reset.

17. The method of claim 12, further comprising calculating the predicted value based on an amount of change of the actually measured value of the phase.

18. The method of claim 17, further comprising calculating the predicted value based on a rotational speed of the engine.

19. A method for avoiding interference between a valve and a piston of an engine, the engine having a variable lift mechanism for changing a lift amount of the valve and a variable phase mechanism for changing a phase of the valve, comprising:

calculating a predicted value of the phase;

determining, based on an actually measured value of the lift amount, a limit value of the phase at which no interference occurs;

adding the limit value to a predetermined margin value; and setting the limit value thus added in a first predetermined value;

making a first determination of whether the predicted value has exceeded the first predetermined value;

changing at least one of the lift amount and the phase to avoid the interference if it is determined that the predicted value has exceeded the first predetermined value.

20. A method for avoiding interference between a valve and a piston of an engine, the engine having a variable lift mechanism for changing a lift amount of the valve and a variable phase mechanism for changing a phase of the valve, comprising:

calculating a predicted value of the phase;

making a first determination of whether an actually measured value of the lift amount has exceeded a first predetermined value;

making a second determination of whether the predicted value has exceeded a second predetermined value; and changing at least one of the lift amount and the phase to avoid the interference if it is determined by the first determination that the actually measured value of the lift amount has exceeded the first predetermined value or if it is determined by the second determination that the predicted value has exceeded the second predetermined value.

21. The method of claim 20, further comprising:

determining, based on an actually measured value of the phase, a limit value of the lift amount at which no interference occurs; and setting the limit value in the first predetermined value.

22. A method for avoiding interference between a valve and a piston of an engine, the engine having a variable lift mechanism for changing a lift amount of the valve and a variable phase mechanism for changing a phase of the valve, comprising:

calculating a predicted value of the lift amount;

making a first determination of whether an actually measured value of the lift amount has exceeded a first predetermined value;

making a second determination of whether the predicted value has exceeded a second predetermined value; and changing at least one of the lift amount and the phase to avoid the interference if it is determined by the first determination that the actually measured value of the lift amount has exceeded the first predetermined value or if it is determined by the second determination that the predicted value has exceeded the second predetermined value.

* * * * *